(12) United States Patent
Sharp et al.

(10) Patent No.: US 11,543,669 B2
(45) Date of Patent: Jan. 3, 2023

(54) WIDE ANGLE VARIABLE NEUTRAL DENSITY FILTER

(71) Applicant: META PLATFORMS TECHNOLOGIES, LLC, Menlo Park, CA (US)

(72) Inventors: Gary D. Sharp, Boulder, CO (US); Anthony D. McGettigan, Santa Rosa, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 7 days.

(21) Appl. No.: 15/916,115

(22) Filed: Mar. 8, 2018

(65) Prior Publication Data
US 2018/0259692 A1 Sep. 13, 2018

Related U.S. Application Data

(60) Provisional application No. 62/468,803, filed on Mar. 8, 2017.

(51) Int. Cl.
*G02B 27/28* (2006.01)
*G02B 5/20* (2006.01)
(Continued)

(52) U.S. Cl.
CPC .......... *G02B 27/281* (2013.01); *G02B 5/205* (2013.01); *G02B 5/3041* (2013.01); *H04N 5/2254* (2013.01)

(58) Field of Classification Search
CPC .... G02B 5/205; G02B 5/3041; G02B 27/281; H04N 5/2254
(Continued)

(56) References Cited

U.S. PATENT DOCUMENTS 2,263,684 A * 11/1941 Ryan ................... F21V 9/14
362/19
2,399,658 A * 5/1946 Banker ................ G02B 26/023
359/489.2
(Continued)

FOREIGN PATENT DOCUMENTS

JP H11277668 A 10/1999
JP 2000356770 A 12/2000
(Continued)

OTHER PUBLICATIONS

Dow Corning "Product Information—DOW Corning® Q23067 Optical couplant" (Year: 1998).*
(Continued)

*Primary Examiner* — George G King
(74) *Attorney, Agent, or Firm* — Greenberg Traurig, LLP

(57) ABSTRACT

A three (or more) polarizer arrangement is used to demonstrate a wide-angle variable-neutral-density (VND) filter that has both contrast uniformity and color uniformity. According to one embodiment, the outer polarizers effectively counter-rotate with respect to a fixed center polarizer as a means of compensating for transmission non-uniformity associated with geometrical polarization distortions experienced by off-normal rays. In particular, the achromatic compensation arrangement enables angle uniformity relative to normal-incidence transmission when the number of stops of attenuation grows large (e.g. 10-stops, or OD3). The filters are useful for cameras or instrumentation allowing mechanical or electromechanical tuning.

15 Claims, 10 Drawing Sheets

(51) Int. Cl.
*G02B 5/30* (2006.01)
*H04N 5/225* (2006.01)

(58) Field of Classification Search
USPC .......................... 359/488.01, 490.01–490.03
See application file for complete search history.

(56) References Cited

U.S. PATENT DOCUMENTS

| | | | |
|---|---|---|---|
| 2,412,074 A * | 12/1946 | Benford | G01N 21/21 |
| | | | 356/367 |
| 2,423,321 A * | 7/1947 | Hurley, Jr. | G02B 27/281 |
| | | | 359/488.01 |
| 2,524,286 A * | 10/1950 | Dreyer | G02B 5/3033 |
| | | | 359/487.02 |
| 2,624,236 A * | 1/1953 | Kirkpatrick | G02B 21/0004 |
| | | | 359/386 |
| 4,202,601 A * | 5/1980 | Burbo | G02B 27/281 |
| | | | 351/49 |
| 4,511,225 A | 4/1985 | Lipson | |
| 4,884,876 A | 12/1989 | Lipton | |
| 5,132,826 A | 7/1992 | Johnson et al. | |
| 5,231,521 A | 7/1993 | Johnson et al. | |
| 5,243,455 A | 9/1993 | Johnson et al. | |
| 5,337,191 A | 8/1994 | Austin | |
| 5,381,253 A | 1/1995 | Sharp et al. | |
| 5,387,958 A | 2/1995 | Pashley | |
| 5,493,426 A | 2/1996 | Johnson et al. | |
| 5,528,393 A | 6/1996 | Sharp et al. | |
| 5,552,912 A | 9/1996 | Sharp et al. | |
| 5,574,553 A | 11/1996 | McManamon et al. | |
| 5,619,355 A | 4/1997 | Sharp et al. | |
| 5,627,666 A | 5/1997 | Sharp et al. | |
| 5,658,490 A | 8/1997 | Sharp et al. | |
| 5,689,317 A | 11/1997 | Miller | |
| 5,715,023 A | 2/1998 | Hoppe | |
| 5,719,650 A | 2/1998 | Wefers et al. | |
| 5,751,384 A | 5/1998 | Sharp | |
| 5,781,268 A | 7/1998 | Liu et al. | |
| 5,822,021 A | 10/1998 | Johnson et al. | |
| 5,870,159 A | 2/1999 | Sharp | |
| 5,892,559 A | 4/1999 | Sharp | |
| 5,892,612 A | 4/1999 | Miller | |
| 5,929,946 A | 7/1999 | Sharp et al. | |
| 5,953,083 A | 9/1999 | Sharp | |
| 5,990,996 A | 11/1999 | Sharp | |
| 5,999,240 A | 12/1999 | Sharp et al. | |
| 6,028,656 A | 2/2000 | Buhrer | |
| 6,046,786 A | 4/2000 | Sharp et al. | |
| 6,049,367 A | 4/2000 | Sharp et al. | |
| 6,075,651 A | 6/2000 | Hoppe | |
| 6,078,374 A | 6/2000 | Sharp et al. | |
| 6,091,462 A | 7/2000 | Sharp et al. | |
| 6,097,461 A | 8/2000 | Sharp | |
| 6,141,069 A | 10/2000 | Sharp | |
| 6,141,071 A | 10/2000 | Sharp | |
| 6,172,722 B1 | 1/2001 | Sharp | |
| 6,183,091 B1 | 2/2001 | Johnson et al. | |
| 6,252,638 B1 | 6/2001 | Johnson et al. | |
| 6,273,571 B1 | 8/2001 | Sharp et al. | |
| 6,310,673 B1 | 10/2001 | Sharp | |
| 6,380,997 B1 | 4/2002 | Sharp et al. | |
| 6,417,892 B1 | 7/2002 | Sharp et al. | |
| 6,452,646 B1 | 9/2002 | Sharp et al. | |
| 6,638,583 B1 | 10/2003 | Sharp et al. | |
| 6,650,377 B2 | 11/2003 | Robinson et al. | |
| 6,667,784 B2 | 12/2003 | Sharp et al. | |
| 6,704,065 B1 | 3/2004 | Sharp et al. | |
| 6,707,516 B1 | 3/2004 | Johnson et al. | |
| 6,735,017 B1 | 5/2004 | Acosta | |
| 6,816,309 B2 | 11/2004 | Chen et al. | |
| 6,882,384 B1 | 4/2005 | Sharp | |
| 6,899,430 B2 | 5/2005 | Johnson et al. | |
| 6,922,221 B2 | 7/2005 | Zhu | |
| 6,961,179 B2 | 11/2005 | Chen et al. | |
| 6,961,181 B2 | 11/2005 | Chen et al. | |
| 7,002,752 B2 | 2/2006 | Chen et al. | |
| 7,083,282 B1 | 8/2006 | Sharp et al. | |
| 7,106,509 B2 | 9/2006 | Sharp | |
| 7,126,649 B2 | 10/2006 | Chen et al. | |
| 7,154,667 B2 | 12/2006 | Birge et al. | |
| 7,195,356 B1 | 3/2007 | Sharp | |
| 7,298,386 B1 | 11/2007 | Sharp et al. | |
| 7,345,723 B2 | 3/2008 | Robinson et al. | |
| 7,436,476 B2 | 10/2008 | Sharp et al. | |
| 7,510,280 B2 | 3/2009 | Sharp | |
| 7,511,787 B2 | 3/2009 | Sharp | |
| 7,528,906 B2 | 5/2009 | Robinson et al. | |
| 7,545,469 B2 | 6/2009 | Robinson et al. | |
| 7,583,439 B2 | 9/2009 | Tsai | |
| 7,692,746 B2 | 4/2010 | Sharp | |
| 7,898,603 B2 | 3/2011 | Sharp | |
| 7,898,734 B2 | 3/2011 | Coleman et al. | |
| 7,905,602 B2 | 3/2011 | Schuck et al. | |
| 8,004,758 B2 | 8/2011 | Coleman et al. | |
| 8,072,681 B2 | 12/2011 | Coleman et al. | |
| 8,085,644 B2 | 12/2011 | Sharp | |
| 8,169,699 B2 | 5/2012 | Petersen et al. | |
| 8,184,215 B2 | 5/2012 | Osterman et al. | |
| 8,194,315 B2 | 6/2012 | Sharp et al. | |
| 8,220,934 B2 | 7/2012 | Schuck et al. | |
| 8,233,034 B2 | 7/2012 | Sharp et al. | |
| 8,328,362 B2 | 12/2012 | Coleman et al. | |
| 8,330,911 B2 | 12/2012 | Hong | |
| 8,403,488 B2 | 3/2013 | Schuck et al. | |
| 8,408,708 B2 | 4/2013 | Sharp | |
| 8,425,041 B2 | 4/2013 | Schuck et al. | |
| 8,427,394 B2 | 4/2013 | Sharp et al. | |
| 8,488,240 B2 | 7/2013 | Petersen et al. | |
| 8,526,106 B2 | 9/2013 | Coleman | |
| 8,540,372 B2 | 9/2013 | Coleman | |
| 8,630,037 B1 | 1/2014 | Osterman | |
| 8,638,400 B2 | 1/2014 | Sharp | |
| 8,659,828 B2 | 2/2014 | Sharp | |
| 8,687,275 B2 | 4/2014 | Coleman | |
| 8,711,477 B2 | 4/2014 | Coleman | |
| 8,724,218 B2 | 5/2014 | Curtis | |
| 8,727,536 B2 | 5/2014 | Schuck | |
| 8,746,876 B2 | 6/2014 | Sharp | |
| 8,757,806 B2 | 6/2014 | Schuck | |
| 8,760,760 B2 | 6/2014 | Coleman | |
| 8,794,764 B2 | 8/2014 | Schuck | |
| 8,820,937 B2 | 9/2014 | Osterman et al. | |
| 8,833,943 B2 | 9/2014 | Schuck | |
| 8,851,680 B2 | 10/2014 | Sharp | |
| 8,891,042 B1 | 11/2014 | Osterman et al. | |
| 8,908,081 B2 | 12/2014 | Davis | |
| 8,941,801 B2 | 1/2015 | Robinson | |
| 9,046,755 B2 | 6/2015 | Sharp | |
| 9,057,880 B2 | 6/2015 | Curtis | |
| 9,086,578 B2 | 7/2015 | Curtis | |
| 9,110,363 B2 | 8/2015 | Petersen | |
| 9,121,999 B2 | 9/2015 | Fan | |
| 9,146,454 B2 | 9/2015 | Coleman | |
| 9,167,236 B2 | 10/2015 | Sharp | |
| 9,223,142 B2 | 12/2015 | Schuck | |
| 9,229,139 B2 | 1/2016 | Osterman et al. | |
| 9,235,057 B2 | 1/2016 | Robinson | |
| 9,310,618 B2 | 4/2016 | Curtis | |
| 9,316,865 B2 | 4/2016 | Osterman et al. | |
| 9,350,980 B2 | 5/2016 | Robinson | |
| 9,380,220 B2 | 6/2016 | Davis | |
| 9,383,590 B2 | 7/2016 | Sharp | |
| 9,457,523 B2 | 10/2016 | Coleman | |
| 9,459,463 B2 | 10/2016 | Sharp | |
| 9,530,397 B2 | 12/2016 | Sharp | |
| 9,554,125 B2 | 1/2017 | Schuck | |
| 9,594,298 B2 | 3/2017 | Schuck | |
| 9,618,765 B2 | 4/2017 | Sharp | |
| 9,625,745 B2 | 4/2017 | Sharp | |
| 9,664,945 B2 | 5/2017 | Liu | |
| 9,680,132 B1 | 6/2017 | Tsai | |
| 9,686,474 B2 | 6/2017 | Davis | |
| 9,709,883 B2 | 7/2017 | Sharp | |

(56) References Cited

U.S. PATENT DOCUMENTS

| | | |
|---|---|---|
| 9,740,016 B2 | 8/2017 | Schuck |
| 9,823,561 B2 | 11/2017 | Sharp |
| 9,854,180 B2 | 12/2017 | Davis |
| 9,910,207 B2 | 3/2018 | Robinson |
| 9,933,631 B2 | 4/2018 | Osterman et al. |
| 9,933,636 B2 | 4/2018 | Sharp |
| 9,946,088 B2 | 4/2018 | Robinson |
| 10,012,884 B2 | 7/2018 | Osterman et al. |
| 10,049,627 B2 | 8/2018 | Schuck |
| 10,054,851 B2 | 8/2018 | Sharp |
| 10,082,675 B2 | 9/2018 | Sharp |
| 10,129,484 B2 | 11/2018 | Davis |
| 10,187,588 B2 | 1/2019 | Davis |
| 10,203,511 B2 | 2/2019 | Schuck |
| 10,393,946 B2 | 8/2019 | Robinson |
| 10,394,040 B2 | 8/2019 | Gollier |
| 10,401,700 B2 | 9/2019 | Osterman et al. |
| 10,416,461 B2 | 9/2019 | Gollier |
| 10,474,229 B1 | 11/2019 | Gollier |
| 10,495,798 B1 | 12/2019 | Peng |
| 10,502,981 B2 | 12/2019 | Sharp |
| 10,520,772 B1 | 12/2019 | Lu |
| 10,539,829 B1 | 1/2020 | Lu |
| 10,545,348 B1 | 1/2020 | Lu |
| 10,571,719 B1 | 2/2020 | McCabe |
| 10,598,928 B1 | 3/2020 | Lam |
| 10,598,945 B1 | 3/2020 | Lu |
| 10,600,352 B1 | 3/2020 | Wheelwright |
| 10,609,364 B2 | 3/2020 | Geng |
| 10,614,767 B2 | 4/2020 | Sharp |
| 10,630,908 B2 | 4/2020 | Davis |
| 10,642,048 B2 | 5/2020 | Peng |
| 10,670,861 B2 | 6/2020 | Gollier |
| 10,670,928 B2 | 6/2020 | Shi |
| 10,678,057 B2 | 6/2020 | Lu |
| 10,678,116 B1 | 6/2020 | Lam |
| 10,690,930 B1 | 6/2020 | Lu |
| 10,691,198 B1 | 6/2020 | Gollier |
| 10,705,401 B1 | 7/2020 | Lu |
| 10,712,485 B1 | 7/2020 | Lam |
| 10,739,611 B2 | 8/2020 | Sharp |
| 10,739,651 B2 | 8/2020 | Sharp |
| 10,809,585 B1 | 10/2020 | Lu |
| 10,838,214 B2 | 11/2020 | Chen |
| 10,839,609 B2 | 11/2020 | Sears |
| 10,845,597 B1 | 11/2020 | Gollier |
| 10,866,429 B2 | 12/2020 | Sharp |
| 10,871,653 B1 | 12/2020 | Osterman et al. |
| 10,890,823 B1 | 1/2021 | Jiang |
| 10,895,675 B2 | 1/2021 | Sharp |
| 10,901,205 B1 | 1/2021 | Lu |
| 10,902,820 B2 | 1/2021 | Peng |
| 10,914,953 B1 | 2/2021 | Lam |
| 10,928,698 B2 | 2/2021 | Osterman et al. |
| 10,934,381 B2 | 3/2021 | Lu |
| 10,935,790 B2 | 3/2021 | Lu |
| 10,935,804 B1 | 3/2021 | Lu |
| 2006/0221024 A1 | 10/2006 | Hotta et al. |
| 2008/0112049 A1 | 5/2008 | Umemoto et al. |
| 2014/0177040 A1 | 6/2014 | Uehara |
| 2015/0070561 A1 | 3/2015 | Oguchi |
| 2015/0276582 A1 | 10/2015 | Skinner et al. |
| 2016/0109730 A1 | 4/2016 | McDowall |
| 2016/0259103 A1 | 9/2016 | Kim et al. |
| 2018/0039004 A1 | 2/2018 | Yun |
| 2018/0039052 A1 | 2/2018 | Khan |
| 2018/0210223 A1 | 7/2018 | Sharp et al. |
| 2018/0259692 A1 | 9/2018 | Sharp |
| 2019/0018177 A1 | 1/2019 | Sharp |
| 2019/0235145 A1 | 8/2019 | Sharp |
| 2019/0235300 A1 | 8/2019 | Sharp |
| 2019/0265467 A1 | 8/2019 | Yun |
| 2019/0271853 A1 | 9/2019 | Sharp |
| 2019/0302479 A1 | 10/2019 | Smyth |
| 2019/0377176 A1 | 12/2019 | Sharp |
| 2019/0377182 A1 | 12/2019 | Sharp |
| 2019/0377183 A1 | 12/2019 | Sharp |
| 2019/0377184 A1 | 12/2019 | Sharp |
| 2020/0116912 A1 | 4/2020 | Sharp |
| 2020/0142276 A1 | 5/2020 | McGettigan |
| 2020/0241305 A1 | 7/2020 | Ouderkirk |
| 2020/0241312 A1 | 7/2020 | McGettigan |
| 2020/0379155 A1 | 12/2020 | Sharp |
| 2020/0409183 A1 | 12/2020 | Saylor |
| 2021/0041711 A1 | 2/2021 | Sharp |

FOREIGN PATENT DOCUMENTS

| | | |
|---|---|---|
| JP | 2001251554 A | 9/2001 |
| JP | 2006284852 A | 10/2006 |
| JP | 2008533524 A | 8/2008 |
| JP | 2008309893 A | 12/2008 |
| JP | 2009237202 A | 10/2009 |
| JP | 2010113255 A | 5/2010 |
| JP | 2010128329 | 6/2010 |
| JP | 2013109008 | 6/2013 |
| JP | 2013521706 A | 6/2013 |
| JP | 2014032279 A | 2/2014 |
| JP | 2014506337 A | 3/2014 |
| JP | 2014123076 A | 7/2014 |
| JP | 2014191346 A | 10/2014 |
| JP | 2015055737 A | 3/2015 |
| JP | 2016046771 A | 4/2016 |
| WO | 2006098881 | 9/2006 |
| WO | 2015153213 | 10/2015 |
| WO | 2015153213 A1 | 10/2015 |

OTHER PUBLICATIONS

Hyperphysics webpage http://hyperphysics.phy-astr.gsu.edu/hbase/phyopt/polcross.html (Year: 2016).*

Jones "Transmittance of a Train of Three Polarizers" Journal of the Optical Society of America, vol. 46, No. 7, pp. 528-533 (Year: 1956).*

Mielenz et al. "Accuracy of Polarization Attenuators" Applied Optics, vol. 11, No. 3, pp. 594-603 (Year: 1972).*

Finley "Third-Polarizing-Filter Experiment Demystified—How It Works" http://alienryderflex.com/polarizer/ (Year: 2004).*

Ruffino, "Precise Continuous Optical Attenuator" Journal of Research of the National Bureau of Standards—C. Engineering and Instrumentation, vol. 74C, pp. 9-13 (Year: 1970).*

Bennett "Accurate Method for Determining Photometric Linearity" Applied Optics, vol. 8, pp. 1265-1270 (Year: 1966).*

International Search Report for International Application No. PCT/US2018/021612, dated Jul. 16, 2018.

Office Action dated Aug. 9, 2022 for Japanese Patent Application No. 2019570347, filed Mar. 8, 2018, 20 pages.

* cited by examiner

Figure 1. Prior art two-polarizer VND filter.

Figure 3. Three-polarizer VND filter.

Figure 5. Four-polarizer VND filter.

WIDE ANGLE VARIABLE NEUTRAL DENSITY FILTER

CROSS-REFERENCE TO RELATED APPLICATIONS

This application claims the benefit of U.S. Provisional Application No. 62/468,803, filed Mar. 8, the content of which is incorporated herein by reference in its entirety.

BACKGROUND

There is a long-standing need, particularly for video and still cameras, to have a filter attachment with a large range in tunable attenuation. For example, a variable neutral density (VND) filter can enable selection of exposure time independent of scene luminance, giving photographers a valued degree of freedom. VND filters use polarization as a means of varying transmission. When polarizer absorption axes are parallel, the transmission is maximum. As one polarizer is rotated with respect to the other (see FIG. 1) the transmission drops, with theoretically zero transmission when the absorption axes are crossed. The issue is that VND filters in the industry tend to introduce spatial/angular artifacts that limit their usefulness in practice. Because of these artifacts, a contrast or color non-uniformity may preclude wide-angle shots and/or high density when the VND filter is placed in front of the camera lens.

Transmission non-uniformity of ideal crossed polarizers is the result of rotation of the absorption axes due entirely to geometry. For rays that are incident off-normal, the worst-case plane-of-incidence azimuth angles are ±45° with respect to a polarizer absorption axis. In the context of VND filters, the most problematic cases occur near crossed polarizers, corresponding to selection of higher densities. For example, 10-stops corresponds to an angle of 88.2° between the axes, giving 0.1% transmission (optical density=3) at normal incidence. FIG. 2 shows the minimum and maximum transmission of a two-polarizer VND at the OD3 setting versus angle of incidence (AOI). At an extreme AOI of ±45°, the highest transmission on the polar transmission plot is 1.9%, and the lowest transmission is zero. So at the worst-case angles, the highest transmission is 19× brighter than the target transmission, and the lowest transmission represents complete blocking of the incoming light, creating a very high contrast artifact. FIG. 2 shows that the minimum transmission falls to zero by 24° AOI, and for all higher AOI, there exists one or more angles with zero transmission. In the context of image capture, this artifact takes the form of a high contrast cross-pattern superimposed on the image.

In many instances, the poly-vinyl-alcohol (PVA) polarizer films are also clad with cellulose-triacetate (TAC) protective films. This further exacerbates the problem by introducing about 100 nm of negative c-plate retardation (i.e. a negative uniaxial retarder with optic axis normal to the substrate) between the PVA films. The c-plate has greatest influence at the ±45° azimuth, with no effect on the %o° azimuth. Thus, the contrast of the cross-pattern is further increased. TAC can also introduce additional haze that contributes to veiling glare. Veiling glare is also increased in current products via multiple air spaced elements, and functional/carrier substrates that scatter light and reduce image contrast. In addition to TAC protective films, this includes haze produced by low-spec thick glass, compensation films and quarter-wave retarder films (e.g. polycarbonate), adhesives, and coatings. Anti-Reflection (AR) coatings reflect some light at normal incidence, with reflectivity and color shift typically increasing off-normal. Similar to lens flare, this produces ghosts particularly when used in wide shots.

Higher quality VND products tend to use "compensation films" to counteract the geometrical rotation phenomenon. Compensators can greatly improve the contrast uniformity by effectively applying a polarization rotation that is specific to the angle of incidence and azimuth. Though this can dramatically mitigate contrast variation, compensators also tend to introduce color shifts. This is because they tend to be composed of uniaxial/biaxial retarder films, which have wavelength dependence (i.e. retardation dispersion). As such, the polarization transformation (as observed on the Poincare Sphere) for a particular incidence angle/azimuth traces a contour as a function of wavelength. The result when polarization is analyzed is a chromatic transmission function, which again can introduce an image artifact. The artifact is typically converted from a high contrast cross to a lower contrast cross with azimuth dependent tint.

Compensator films include single-layer biaxial half-wave retarders oriented along an absorption axis, where the retardation in the thickness direction is quarter-wave. In the ±45° azimuth, the projection of the optic axis deviates from the polarizer absorption axis in a way that increases with incidence angle. The half-wave retarder reflects the input polarization about the slow axis, thus aligning the polarization with the absorption axis of the analyzing polarizer. This greatly reduces the leakage, but introduces color shift.

A pair of polarizers with a biaxial half-wave retarder between them, using an angle of 88.2° (10-stops) gives a range in transmission of 0.43 log units at a maximum of 45° incidence, which is much improved over the casewithout compensation. But at an azimuth of 45°, the filter has a spectral minimum at the half-wave retardation (typically at about 520 nm for polycarbonate). This causes a decidedly magenta tint, particularly at the 45°/−135° azimuth angles. The deviation in color for an ideal spectrally flat input at this incidence angle is $\Delta_{u'v'}=0.083$. At %o°, the output is in general achromatic.

Another compensator is a biaxial film combined with a positive c-plate (positive uniaxial with optic axis normal to the substrate). For instance, a biaxially stretched film with an in-plane retardation of 115 nm and a thickness direction retardation of 103.5 nm, combined with a positive c-plate retardation of 150 nm is another embodiment. Like the biaxial half-wave retarder, it is a corrector of geometrical distortion. And likewise, the retarders have a dispersion that causes azimuth-dependent color shift. The worst-case contrast variation for this solution, assuming zero birefringence dispersion, is 0.84 log units at 10-stops, and the color shift is $\Delta_{u'v'}=0.147$ relative to equal-energy white. This solution shows more azimuth-dependent color variation than the former, with a maximum deviation between any two points of $\Delta_{u'v'}=0.196$. Another form of VND filter is electro-optical; using liquid crystal devices to change density. In some applications (e.g. intra-field modulation of density in video), rapid tuning and the lack of moving parts is advantageous. Significant progress has been made in recent years to produce LC VND filters with angle-insensitive density/color and sufficient range in tuning density. However, the ability to maintain uniform transmission and color over a 45° half-cone angle, and over the full range of density tuning, is extremely challenging for LC devices. This may force them into positions in the optical train where light is more collimated, a situation that may be undesirable. Moreover, there can be disadvantages to an electro-optic device (e.g. for unmanned aerial vehicles, UAVs, or drones), where the need for constant application of a DC-balanced drive voltage results in an undesirable consumption of power. Electro-mechanical tuning need only consume power when the density is changed.

SUMMARY

Disclosed herein is a rotationally reconfigurable opto-mechanical structure. The structure includes a first optically functional layer sensitive to rotation about its surface normal; a second optically functional layer sensitive to rotation about its surface normal; a cavity formed between the first optically functional layer and the second optically functional layer; a mechanical structure for enabling rotation of first layer with respect to second layer; and a transparent optical grease filling the cavity between the layers that remains in-tact during rotation of first layer with respect to second layer. The refractive index of the grease is substantially matched to that of the first optically functional layer and the second optically functional layer.

The first and second optically functional layers may be linear polarizers. One or more of the first and second optically functional layers may be retarders. The first and second optically functional layers may be laminated to external substrates using a pressure-sensitive-adhesive.

Also disclosed in a variable neutral density filter receptive of input light having an input polarization. The filter includes a first polarizer; a retardation plate with multiple waves of in-plane retardation; and a second polarizer. The input polarization is substantially depolarized using the retardation plate. The retardation is greater than 10-waves. The retarder is one of quartz, sapphire, or lithium niobite. The retardation is sufficiently large that color shift from input light with a polarized input spectral-power-distribution is below a just-noticeable-difference.

Also disclosed is a variable neutral density filter that includes a first polarizer; a second polarizer; and an angle-of-incidence sensitive near-infrared reflecting filter. The polarizers have a polarizing efficiency with a spectral coverage that extends into the near-infrared, creating a don't-care band. An angle-of-incidence sensitive near infrared reflecting filter substantially reflects light at normal-incidence from the long-wavelength edge of the don't-care band to approximately 1,000 nm. The near infrared reflecting filter passes visible light with imperceptible color shift from normal incidence to a maximum cutoff angle-of-incidence.

Also disclosed is a variable neutral density filter that includes a first polarizer; a second polarizer; and a substantially angle-of-incidence insensitive near-infrared reflecting filter. The near-infrared reflecting filter includes repeating stacks of thin silver and dielectric layers coated on a visible transmitting substrate.

Also disclosed is a variable neutral density filter that includes a first polarizer; a second polarizer; and a mechanical structure for rotating the first and second polarizers. A first actuator enables rotation of first (input) polarizer and second (output) polarizer in unison, and a second actuator enables rotation of second polarizer without changing the orientation of first polarizer.

Also disclosed is a variable neutral density filter (VND) that includes a first polarizer; a second polarizer; and a third polarizer. The first and second polarizers form a first attenuation stage, with transmission determined by a first angle formed between the first and second polarizer absorption axes. The second and third polarizers form a second attenuation stage, with a transmission determined by a second angle formed between second and third polarizer absorption axes. The composite transmission is the product of the first stage transmission and the second stage transmission. The set of first and second angles is selected to preserve the normal-incidence composite transmission for rays incident off-normal.

The angle between first and second polarizers may be +θ, and the angle between second and third polarizers may be −θ. The addition of a third polarizer may reduce the angle resolution requirement at the maximum density setting. The transmission non-uniformity may be below 0.5 log units at 10-stops of attenuation of polarized light at an incidence angle exceeding 35°. The set of angles may be selected to minimize transmitted brightness and color non-uniformity over the full range of density settings and incidence angles. The cavity formed between first/second polarizers and second/third polarizers may be filled with an optical grease. The first, second, and third polarizers may be laminated to transparent substrates using a pressure-sensitive-adhesive. The optical grease may eliminate AR coatings and reduce polarizer flatness requirements. The optical grease may eliminate substrates otherwise required to achieve acceptable transmitted wavefront distortion.

A mechanical tuning structure may be further included, wherein a first actuator enables rotation of first (input) polarizer, second (middle) polarizer, and third (output) polarizer in unison, and wherein a second actuator enables rotation of third polarizer with respect to first polarizer and wherein a third actuator slaves second polarizer angle to third polarizer angle. A rack-and-pinion arrangement may rotate the second polarizer at half the rate of the third polarizer. Detents may provide the number of stops of attenuation by user feel. Markings may provide a visual indication of the number of stops of attenuation.

An electro-mechanical device may select an amount of composite transmission. A user may remotely tune the density based on brightness information from either the camera feed or a brightness sensor. An optimum brightness level may be pre-selected and the motor and brightness sensor may form a closed-loop system that auto-selects density. The VND filter may be installed on an unmanned aerial vehicle camera. The VND filter may be installed on a drone camera.

DETAILED DESCRIPTION

Figure 1:
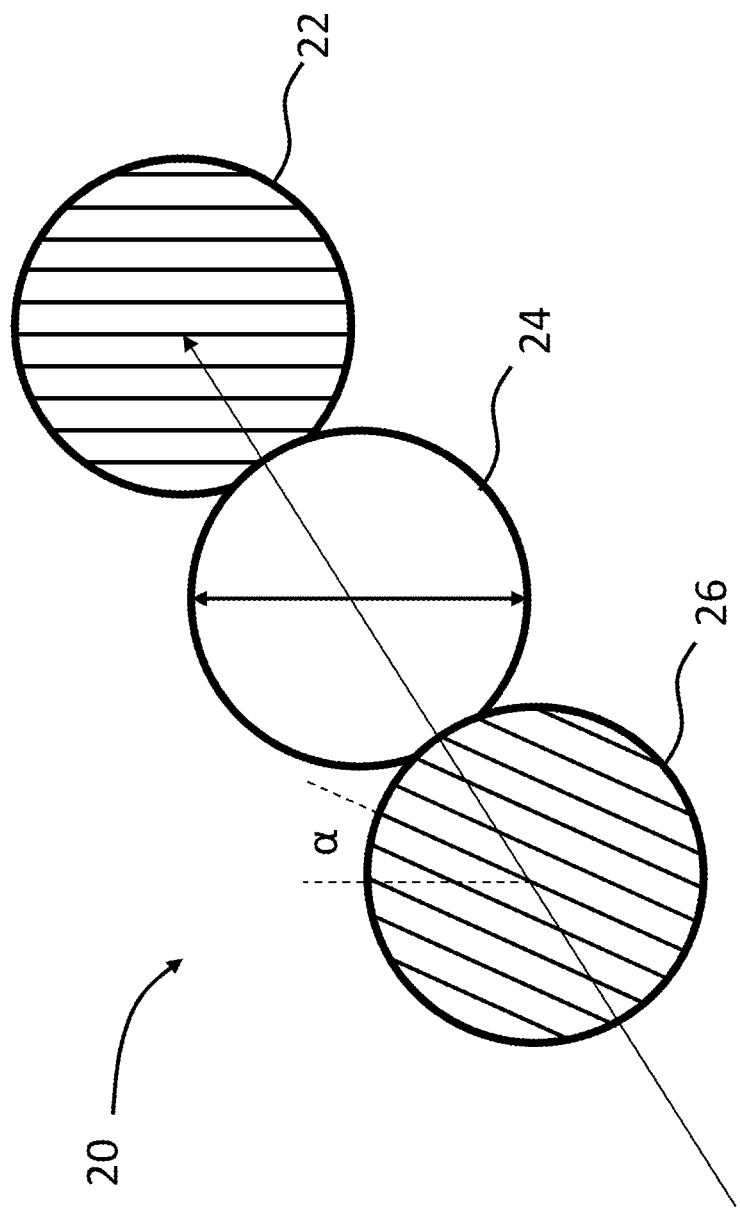
FIG. 1 shows a prior art two-polarizer variable neutral density filter.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Today, photographers and videographers can either select between a set of fixed neutral density filters, VND filters with high-contrast achromatic cross artifacts, or lower-contrast chromatic cross artifacts. There is thus a long-standing need, particularly in photography and video capture, for a variable neutral density filter that is truly neutral and maintains high uniformity in contrast and color over a wide acceptance angle and attenuation range.

Described herein are arrangements of three or more linear polarizers that, in pairs, have the usual geometrical transmission artifacts. But because the transmission variations are achromatic, a polarizer-only scheme has the benefit that there are no color shifts. The solution presented herein is to arrange the polarizers such that they act in a cooperative manner; where the composite transmission function exhibits minimal transmission variations with incidence angle and azimuth.

For a particular desired transmission level, there are is a continuum of relative polarizer orientations in a three-polarizer configuration that satisfies the normal incidence requirement. However, some have little benefit, and some even compound the transmission non-uniformity. According to embodiments, angular arrangements compensate for transmission variations caused by geometrical rotation at each density setting. In the case of a three-polarizer design, there are essentially two transmission functions associated with first/second polarizers, and second/third polarizers. Each has a geometrical distortion, though an optimized design maximizes the correspondence between an azimuth dependent transmission maximum of one set, and a transmission minimum of another. This tends to smooth the azimuthal transmission variations, greatly suppressing transmission variation. And because there are no dispersive elements, no color non-uniformity is introduced.

The designs become increasingly effective as the number of stops of attenuation is increased. Obviously there is only one solution for a zero-stop transmission: all polarizers are parallel. Here, there is no geometrical distortion, and thus no need for compensation. The effectiveness of the disclosed compensation scheme increases as the need for it increases at higher densities, thus preserving good performance even as the filter has maximum attenuation (e.g. 10 stops).

In a practical application, mechanical or electro-mechanical hardware is used to realize the optimum arrangement of polarizer angles for each stop of attenuation. In a photography application, it may be necessary for the input (first) polarizer to be locked in a user-selected orientation, such that the second and third polarizers are then oriented relative to that angle. In a subsequent optical density adjustment, the third polarizer can be adjusted, with the angle of the second polarizer slaved to it. This arrangement is termed two-step tuning and is described in co-pending application (Tunable Color Enhancement, PCT Application No. PCT/US2018/015041, the entire contents of which are incorporated herein by reference).

The approach can be extended to four or more polarizer designs. In going from three to four polarizers, an additional degree of freedom is introduced that can further improve contrast uniformity.

Also described are the many design considerations that are necessary in order to successfully deploy a VND filter with wide-angle and a high density range. It further describes designs that are simple in construction and are optically monolithic, thus minimizing veiling glare and ghost reflections.

The following detailed analysis of a two-polarizer VND is instructive because: (a) it frames the problem and gives baselines performance, and; (b) two-polarizer configurations are the building blocks of the inventive techniques. FIG. 1 shows a prior art VND filter 20. Analyzing polarizer 22, with absorption axis denoted by a series of vertical lines, extinguishes an amount of input light selected by the user. An optional compensator 24 with an optic axis shown as a vertical arrow can improve the lightness nonuniformity induced by geometrical effects off-normal. Polarizer 26 has a user-selected absorption axis orientation, $\alpha$. At normal incidence, this simple configuration can perform quite well. But the normal incidence transmission is not in general maintained when this VND filter must accept a cone of light.

Contrast non-uniformity, particularly of nearly crossed polarizers, is the result of rotations of the absorption axes due entirely to geometry. For rays that are incident off-normal, the maximum geometrical rotation occurs when the plane of incidence (POI) is at ±45° to the absorption axis of a polarizer. When there are a pair of polarizers, the maximum geometrical rotation between the polarizers occurs when the POI bisects the polarizer absorption axes. In one extreme, the absorption axes appear to rotate together, increasing transmission, and at 90° to this POI, they appear to rotate apart, decreasing transmission. Geometrical rotations off-normal thus cause changes in density that are strongly azimuth dependent. When the density setting is low, small geometrical rotations have relatively little impact on uniformity. However, when the density is high, a small geometrical rotation in a particular azimuth can push the transmission to zero, causing an unacceptable artifact. Conversely, small opposing geometrical rotations can increase transmission far above the set density value. When the axes are crossed (for theoretically infinite density), the density is preserved along the %₀° azimuth, where there is no geometrical rotation. The leakage in general increases maximally along the ±45° azimuth. This artifact is often characterized by photographers and videographers as the "dreaded X".

For a pair of ideal linear polarizers (i.e. zero transmission along the absorption axis, and unity transmission orthogonal to the absorption axis) the transmission function, not including the filtering effect of the first polarizer is given by $$T(\theta,\alpha_1,\phi_1,\alpha_2,\phi_2)=\cos^{2}[\alpha_2(\theta,\phi_2)-\alpha_1(\theta,\phi_1)]$$

where $\alpha(\theta,\phi)$ is the projected angle between polarizer absorption axes. It includes both the normal-incidence selected angle-difference and the incremental rotation due to geometrical rotation, where $$\alpha_2(0)\alpha_1(0)=\alpha$$

with α the selected angle difference, and $$T(0) = \cos^2(\alpha)$$

The azimuth angles differ in the equation because the coordinate system is associated with the specific polarizer orientations relative to the POI. The angle is set for a desired optical density at normal incidence. For example, 10-stops of attenuation corresponds to an angle of α=88.2° between the polarizers, giving 0.1% transmission (optical density=3 log units).

Contrast non-uniformity is described here in terms of log units, a metric related to the perception of contrast observed when viewing an image. In a particularly challenging situation, the transmission non-uniformity corresponds to an image captured through the VND filter of a uniform lambertian source/scatterer that is spectrally flat. A particular attenuation setting at normal incidence is expressed by $\log[T_0]$. In general, the transmission in cylindrical polar coordinates is given by $\log[T(\theta,\phi)]$ where θ is the incidence angle in air with respect to normal, and φ is the azimuth angle. To simplify the analysis, an attenuator expected to function to an extreme AOI, $\theta_{max}$, bounds a transmission maximum $\log[T_{max}]$ and a transmission minimum $\log[T_{min}]$. Though the maximum and minimum tend to reside at the maximum incidence angle, they are sometimes at a reduced incidence angle.

Log units express the "image" associated with the VND filter artifact in a manner consistent with the response of the vision system. The raw contrast between the maximum transmission and center target transmission is $T_{max}/T_0$, or in log units by $\log[T_{max}]-\log[T_0]$. Similarly, the contrast between the center target transmission and the minimum transmission is $T_0/T_{min}$, or $\log[T_0]-\log[T_{min}]$. The peak-to-valley contrast non-uniformity in log units is given as the sum of these, or $$R = \log[T_{max}] - \log[T_{min}]$$

Obviously the above equation becomes unstable when the minimum transmission approaches zero, a situation that can easily occur with two-polarizer VND filters. An unacceptable threshold for nonuniformity occurs in practice before this extreme situation is reached.

Figure 2:
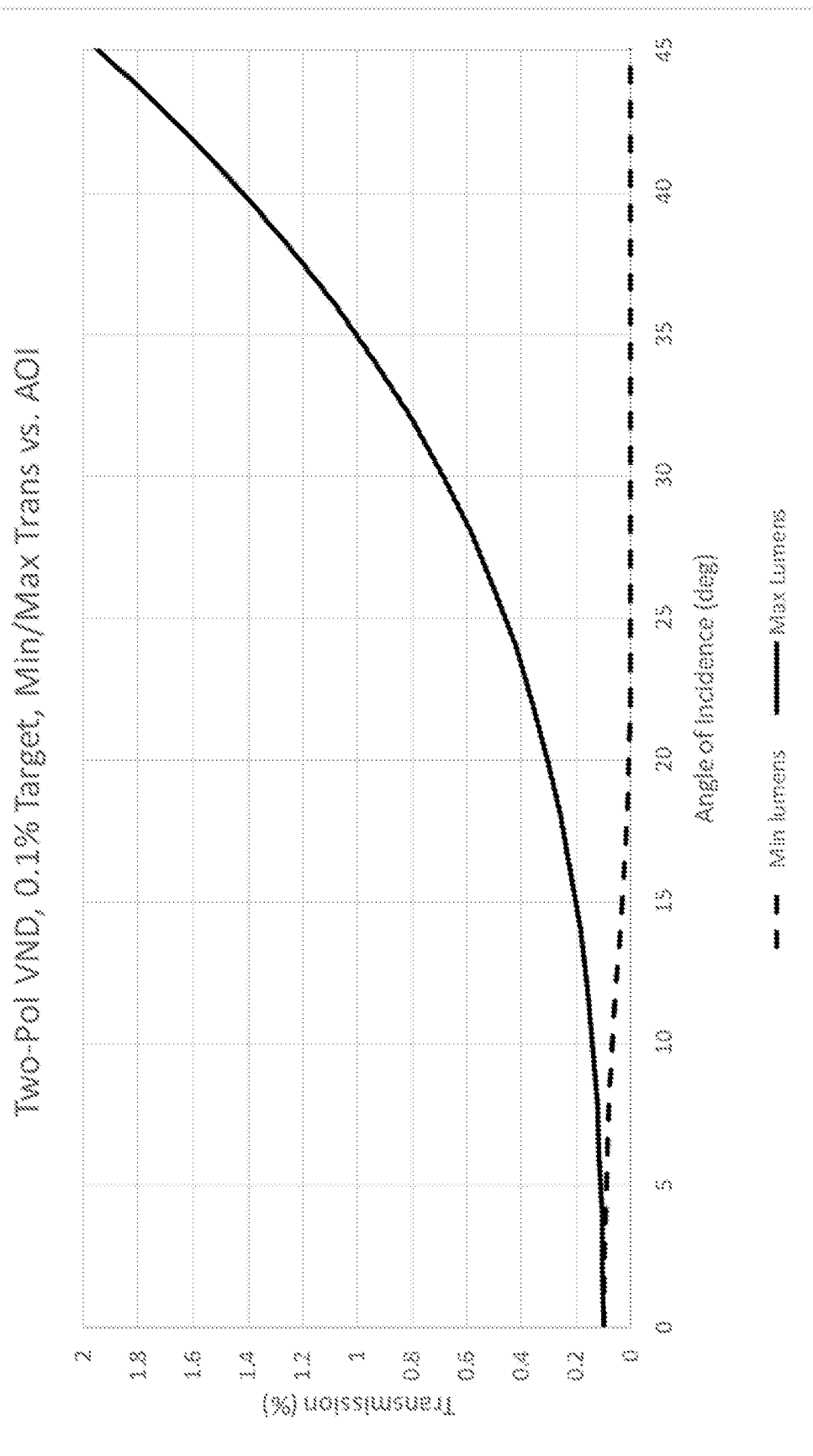
FIG. 2 shows a two-polarizer VND filter set to OD3 (0.1% transmission). This shows the minimum and maximum transmission values that occur in the polar transmission function versus incidence angle.

A Berreman 4×4 matrix model was used to generate transmission polar plots. To illustrate the sensitivity of geometrical rotation at high density, the minimum and maximum transmission values were extracted from the polar plots for a two-polarizer VND filter set to a density of OD3. FIG. 2 shows that the min/max values begin to deviate from the 0.1% set point after only a few degrees. By 22° AOI, the polar plot contains a transmission null, which persists for all larger AOI. The maximum transmission value is twice the set point by 15° AOI, and just increases with AOI beyond this.

Using the model, polar plots were also generated at each stop of attenuation for a maximum incidence angle off-normal in air of 20° for the two-polarizer prior-art filter. From these plots, maximum and minimum transmission values were located in angle space, which were then converted to a peak-to-valley nonuniformity in log units. The polarizers are ideal, the input spectral power distribution is flat, and the contrasts are photopic. Note that, while calculated/monitored, no significant color shift is ever observed in these plots.

Table 1 gives the baseline two-polarizer case, showing the polarizer absolute angles (without loss of generality), the extreme maximum and minimum transmission, and the transmission nonuniformity in log units for each stop of attenuation. Note that the transition between nine and 10 stops takes only 0.7° of polarizer rotation, requiring high precision in angular resolution of the mechanical elements from a user standpoint. The table is based on a maximum AOI of 20°, because at larger AOI the minimum transmission approaches zero and the nonuniformity in log units becomes unstable at higher density settings. Practically, a nonuniformity exceeding one log unit is unlikely to be acceptable. Table 1 is based on a polarized input, with a one-stop offset incurred for all entries if the input is assumed unpolarized.

TABLE 1

Photopic contrast uniformity performance of a 2-Polarizer VND filter at a maximum incidence angle of 20°.

| P1 Angle | P2 Angle | Stops of Attenuation | Normal Transmission (LU) | Max Transmission (LU) | Min Transmission (LU) | Range (LU) |
|---|---|---|---|---|---|---|
| 0 | 0 | 0 | 0 | 0 | 0 | 0 |
| 0 | 45.0° | 1 | −0.30 | −0.287 | −0.317 | 0.030 |
| 0 | 60.0° | 2 | −0.60 | −0.573 | −0.635 | 0.062 |
| 0 | 69.3° | 3 | −0.90 | −0.855 | −0.956 | 0.101 |
| 0 | 75.5° | 4 | −1.20 | −1.13 | −1.28 | 0.150 |
| 0 | 79.8° | 5 | −1.50 | −1.40 | −1.62 | 0.220 |
| 0 | 82.8° | 6 | −1.81 | −1.66 | −1.98 | 0.320 |
| 0 | 84.9° | 7 | −2.11 | −1.90 | −2.38 | 0.480 |
| 0 | 86.4° | 8 | −2.41 | −2.13 | −2.81 | 0.680 |
| 0 | 87.5° | 9 | −2.70 | −2.35 | −3.39 | 1.040 |
| 0 | 88.2° | 10 | −3.00 | −2.52 | −4.15 | 1.630 |

The above verifies that a two-polarizer VND cannot simultaneously accommodate a large acceptance angle and a wide density range given any reasonably acceptable contrast nonuniformity. Either a very limited dynamic range is available when using a short focal length lens, or a large dynamic range is feasible when using a very long focal length lens. It is also important to note that the artifact doesn't suddenly appear at a particular combination of focal length and density; an undesirable artifact is present at densities far below the threshold of unacceptability.

Three-Polarizer VND

One or more additional polarizers can be used, along with a specific set of relative angles, to largely eliminate the impact that geometrical rotation has on the prior art VND filter. If three polarizers are used, the transmission function becomes $$T(\theta,\alpha_1,\phi_1,\alpha_2,\phi_2,\alpha_3,\phi_3) = \cos^2[\alpha_2(\theta,\phi_2)-\alpha_1(\theta,\phi_1)]\cos^2[\alpha_3(\theta,\phi_3)-\alpha_2(\theta,\phi_2)]$$

where $\alpha_1$, $\alpha_2$, $\alpha_3$, give the geometry-dependent angles between first/second, and second/third polarizer absorption axes. The VND filter transmission function is now determined by the product of two attenuation stages, with a continuum of angle combinations 1 producing the desired optical density at normal incidence. The exception is zero-stops of attenuation, where a single solution is possible (i.e. all polarizers parallel). Nevertheless, the degree of freedom introduced by the third polarizer allows some flexibility in separately orienting the contrast polar plots of each stage in a complementary manner.

According to an embodiment, the second polarizer is effectively fixed, with the outer polarizers counter-rotating to produce the desired optical density. At normal incidence this reduces to a single variable, or $$\alpha_3(0)-\alpha_2(0)=\alpha_2(0)-\alpha_1(0)=\alpha$$

and the normal incidence transmission becomes $$T(0)=\cos^4(\alpha)$$

which is used to determine the polarizer angles as a function of stops of attenuation.

Figure 3:
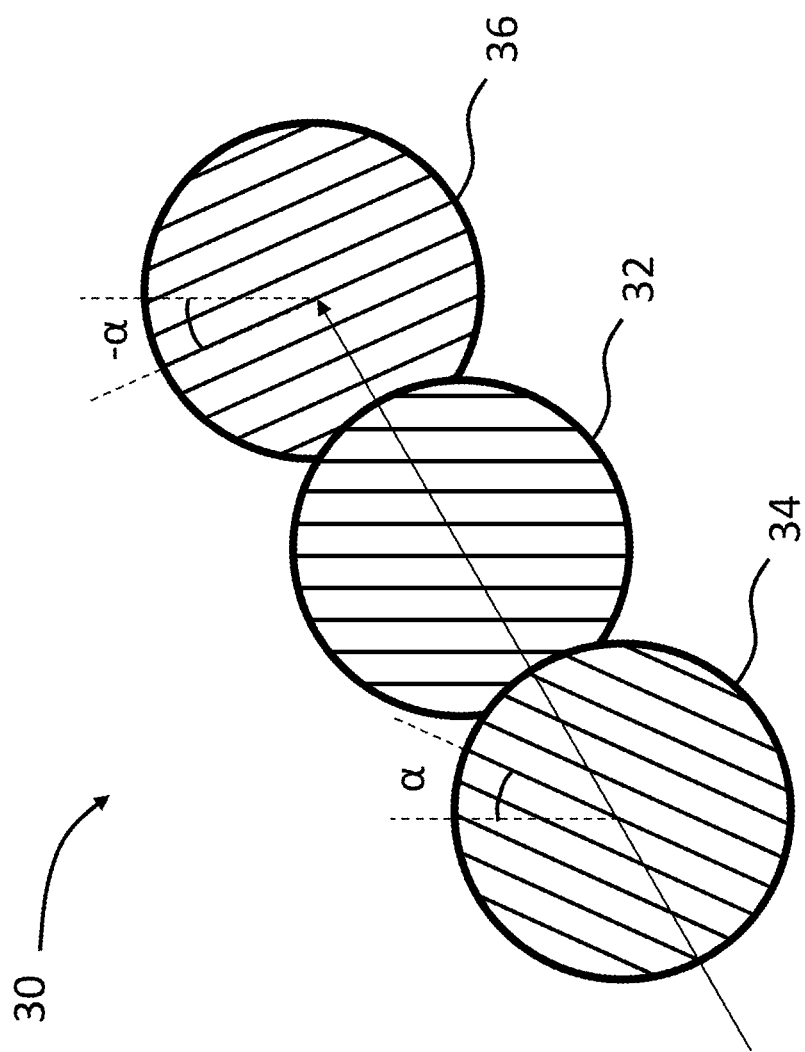
FIG. 3 shows a wide field-of-view three-polarizer variable neutral density filter of the present invention.

FIG. 3 shows a three-polarizer VND filter 30. In this configuration, center polarizer 32 has a fixed vertical orientation and the outer polarizers 34 and 36 counter rotate by angles $\alpha$ and $-\alpha$, respectively, to produce the desired attenuation.

Figure 4:
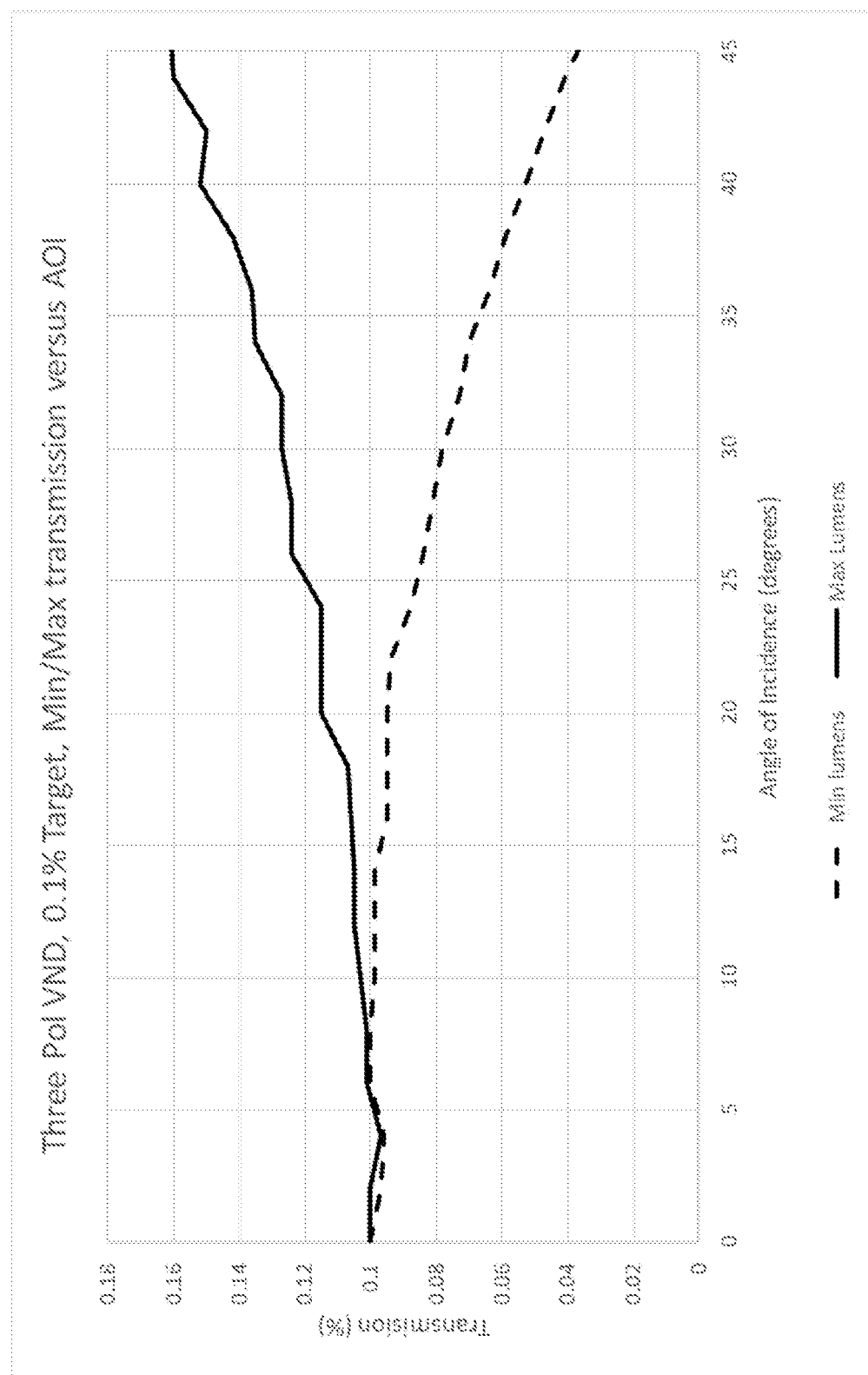
FIG. 4 shows a three-polarizer VND filter of the present invention set to OD3 (0.1% transmission); this shows the minimum and maximum transmission values that occur in the polar transmission function versus incidence angle.

As in the prior-art analysis, the model was used to assess the nonuniformity of the three-polarizer VND filter when the density is set to OD3. FIG. 4 shows that at an extreme AOI of 45°, the maximum transmission increases from 0.1% to 0.16%, and the minimum transmission falls to 0.04%. The former occurs for the two-polarizer case at 8° AOI, and the latter at 14° AOI.

Table 2 shows the 3-polarizer performance, in the same format at Table 1. Because the uniformity remains high at large density and AOI, the three-polarizer VND was evaluated at an extreme AOI of 45°. Note that any polarizer could be fixed in angle with the other two rotating by the appropriate relative amount, giving the same transmission function. While the non-uniformity grows with number of stops as before, it is at a much lower rate than the two-polarizer case. The maximum non-uniformity range at 10-stops is 0.556 log units. Given that this represents a low spatial frequency function, it is arguable that even this extreme case would not be visually problematic when superimposed on an image. For instance, cinema screens with moderate gain show similar fall-off in brightness from center to corner, which the vision system does not perceive when viewing imagery.

TABLE 2

Photopic contrast uniformity performance of a 3-Polarizer VND filter at a maximum incidence angle of 45°.

| P1 Angle | P2 Angle | P3 Angle | Stops of Attenuation | Normal Transmission (LU) | Max Transmission (LU) | Min Transmission (LU) | Range (LU) |
|---|---|---|---|---|---|---|---|
| 0 | 0 | 0 | 0 | 0 | 0 | 0 | 0 |
| −32.8° | 0 | 32.8° | 1 | −0.30 | −0.253 | −0.361 | 0.107 |
| −45.0° | 0 | 45.0° | 2 | −0.60 | −0.516 | −0.699 | 0.183 |
| −53.5° | 0 | 53.5° | 3 | −0.90 | −0.788 | −1.027 | 0.239 |
| −60.0° | 0 | 60.0° | 4 | −1.20 | −1.070 | −1.347 | 0.276 |
| −65.1° | 0 | 65.1° | 5 | −1.50 | −1.356 | −1.658 | 0.302 |
| −69.3° | 0 | 69.3° | 6 | −1.81 | −1.650 | −1.972 | 0.322 |
| −72.7° | 0 | 72.7° | 7 | −2.11 | −1.943 | −2.281 | 0.338 |
| −75.5° | 0 | 75.5° | 8 | −2.41 | −2.240 | −2.623 | 0.383 |
| −77.8° | 0 | 77.8° | 9 | −2.70 | −2.527 | −2.983 | 0.455 |
| −79.8° | 0 | 79.8° | 10 | −3.00 | −2.842 | −3.398 | 0.556 |

Four Polarizer VND

Further angular uniformity improvements are possible by introducing a fourth polarizer, giving another degree of freedom. This gives the transmission function $$T(\theta,\alpha_1,\phi_1,\alpha_2,\phi_2,\alpha_3,\phi_3\alpha_4,\phi_4)=\cos^2[\alpha_2(\theta,\phi_2)-\alpha_1(\theta,\phi_1)]\cos^2[\alpha_3(\theta,\phi_3)-\alpha_2(\theta,\phi_2)]\cos^2[\alpha_4(\theta,\phi_4)-\alpha_3(\theta,\phi_3)]$$

In an embodiment, symmetry can again be introduced to reduce the number of variables from four to two using the normal incidence angle arrangement $(\alpha, \alpha', -\alpha', -\alpha)$ giving, $$\alpha_2(0)-\alpha_1(0)=\alpha_4(0)-\alpha_3(0)=(\alpha'-\alpha), \quad \text{and} \quad (\alpha_3(0)-\alpha_2(0)=2\alpha'$$

With normal incidence transmission function $$T(0)=\cos^2[2\alpha']\cos^4[\alpha'-\alpha]$$

For a particular first polarizer angle, a range of second polarizer angles can be generated that satisfy the optical density requirement at normal incidence. For each set, the model was used to determine which pair gives the lowest angular non-uniformity. Note that as the number of stops of attenuation becomes large, it becomes more difficult for the model to resolve the optimum case. However, it was found that there was low sensitivity when near the optimum case. Table 3 shows the performance of the four-polarizer case.

TABLE 3

Photopic contrast uniformity performance of a 4-Polarizer VND filter at a maximum incidence angle of 45°.

| P1, −P4 Angle | P2, −P3 Angle | Stops of Attenuation | Normal Transmission (LU) | Max Transmission (LU) | Min Transmission (LU) | Range (LU) |
|---|---|---|---|---|---|---|
| 0 | 0 | 0 | 0 | 0 | 0 | 0 |
| 39.8° | 10.0° | 1 | −0.30 | −0.2604 | −0.3497 | 0.0893 |
| 54.3° | 12.0° | 2 | −0.60 | −0.5452 | −0.6696 | 0.1244 |
| 64.7° | 14.0° | 3 | −0.90 | −0.8327 | −0.9626 | 0.1299 |
| 75.2° | 20.0° | 4 | −1.20 | −1.1688 | −1.2449 | 0.0761 |
| 83.1° | 24.0° | 5 | −1.50 | −1.4814 | −1.5376 | 0.0561 |
| 89.7° | 28.0° | 6 | −1.81 | −1.8013 | −1.8633 | 0.0619 |
| 94.5° | 34.0° | 7 | −2.11 | −2.0862 | −2.1805 | 0.0943 |
| 99.3° | 35.0° | 8 | −2.41 | −2.3979 | −2.4815 | 0.0835 |
| 103.2° | 37.0° | 9 | −2.70 | −2.7100 | −2.8539 | 0.1439 |
| 107.2° | 37.0° | 10 | −3.00 | −3.0000 | −3.2218 | 0.2218 |
| 110.5° | 37.0° | 11 | −3.30 | −3.2676 | −3.6990 | 0.4314 |

At 10-stops, the maximum non-uniformity at 45° incidence is reduced to 0.22 log units, versus 0.56 log units for the three-polarizer case. An additional stop of attenuation was included because the 4-polarizer case has such low contrast non-uniformity. While the model could not accurately predict performance at 12 stops, it is plausible that it could perform adequately at 12 or more stops. Note that the transition from 9- to 10-stops of attenuation has an even further reduced angle resolution requirement. Polarizers two and three can remain at ±37.0°, while the angle adjustment step of polarizers one and four is increased to four degrees, which is twice that for the three-polarizer design.

Figure 5:
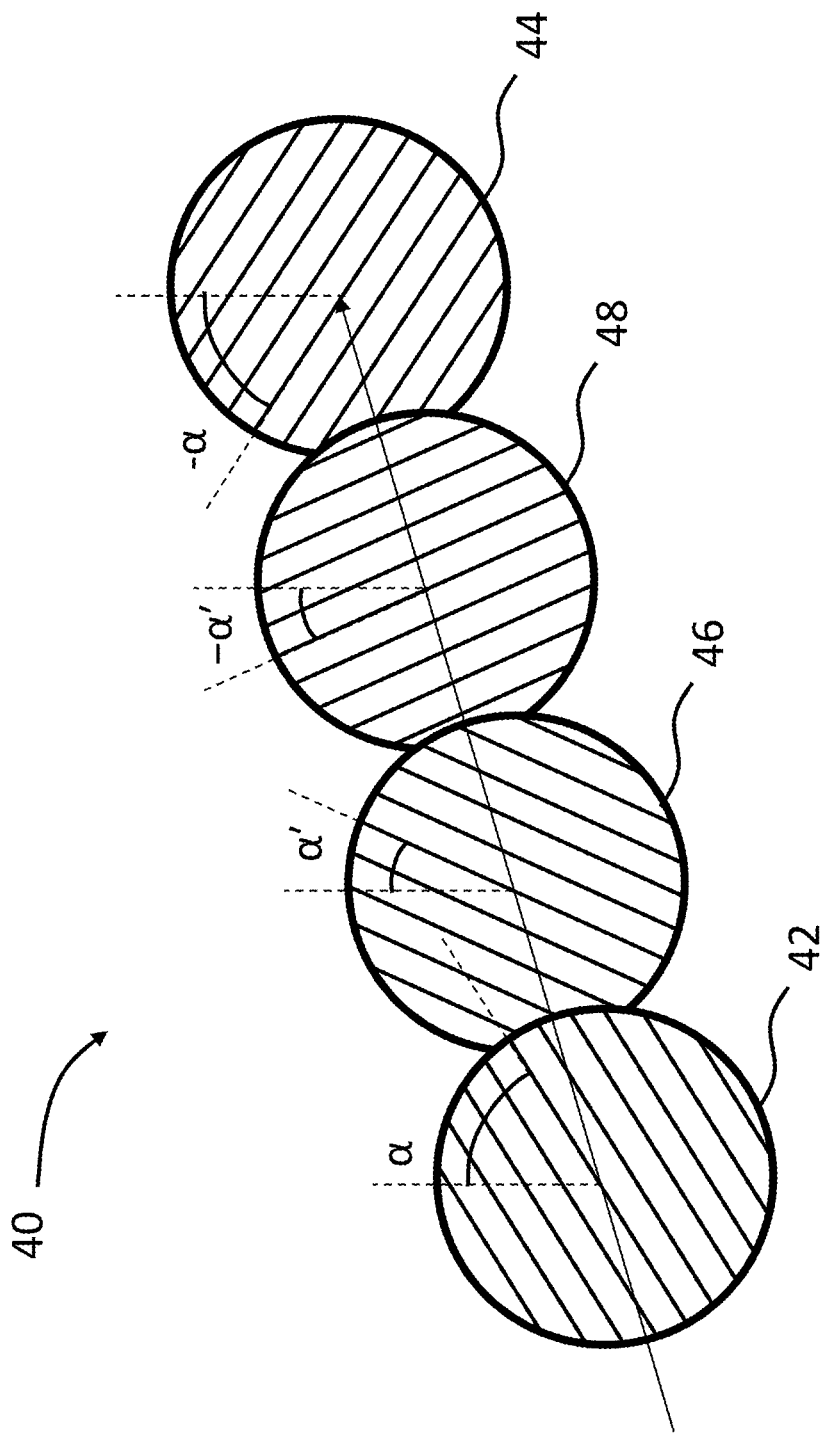
FIG. 5 shows a wide field-of-view four-polarizer variable neutral density filter of the present invention.

FIG. 5 shows a specific configuration of four-polarizer VND filter 40 of the present invention. Outer polarizers 42 and 44 counter rotate with respect to the vertical by angles $\alpha$ and $-\alpha$, respectively. Inner polarizers 46 and 48 counter rotate with respect to the vertical by angles $\alpha'$ and $-\alpha'$, respectively. A look-up table can be generated that gives the relationship between these angles to generate both the desired optical density at normal incidence, as well as the optimum off-normal transmission uniformity.

Figure 6:
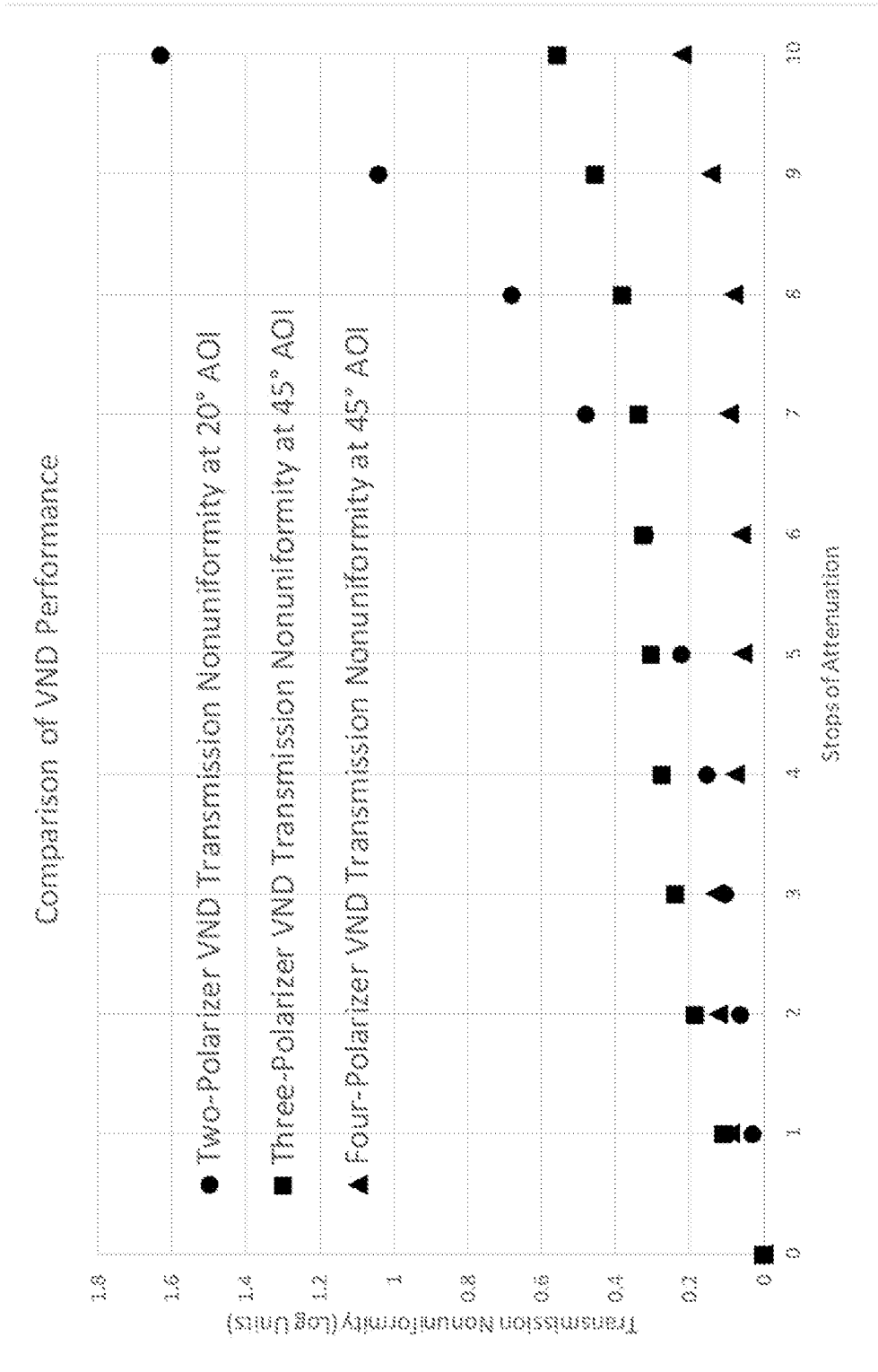
FIG. 6 is a comparison of two, three, and four polarizer variable neutral density filters; the x-axis is the number of stops of attenuation (assuming ideal polarizers, and a polarized input), and the y-axis is the peak-to-valley contrast nonuniformity in log units.

FIG. 6 compares the transmission nonuniformity of the three VND filter designs evaluated. The prior-art two-polarizer VND was evaluated at a reduced AOI of 20° for reasons discussed previously. The three-polarizer and four-polarizer designs have higher nonuniformity at low density, due entirely to the fact that the maximum AOI is 45°, versus 20°. However, the cross-over is 6-stops, and for higher density the three-polarizer case outperforms the two-polarizer case. The cross-over for the four-polarizer case is about 3-stops, beyond which the design performs much better than the two-polarizer case. Were the VND filter designs of the invention evaluated at 20° AOI, the performance would be better than the prior art for any attenuation level (except zero-stops where they are the same).

Material and Optical Considerations

The following are additional design/fabrication considerations for making a VND filter according to the invention that performs optimally; truly enabling a large density-range and wide acceptance-angle. The practical optical performance of a VND filter can be limited by material choices, fabrication processes, and the number of surfaces in air.

Much of the high-quality VND filter product available today is fabricated by laminating polymer between glass, followed by double-side polishing, followed by broad-band antireflection (BBAR) coating. This process sequence is labor intensive, expensive, and typically results in thick/heavy parts. While this solution can improve transmitted wavefront distortion, it may thus be at the expense of other performance metrics.

A VND filter containing N polarizers would normally have (N-1) air cavities, and 2N reflecting surfaces. The two external surfaces are unavoidable, with reflection at the input surface impacting throughput, but not in principle contributing to stray light. The output (sensor-side) surface can contribute to stray light because it directs light back toward the input. It should receive a broad-band antireflection (BBAR) coating that minimizes reflectivity over the entire angular field. This could be a physical-vapor-deposition (PVD) coating, or a moth-eye embossing for example. The cavities created by air-spaced VND filters can be particularly problematic, due to coupling between the closely spaced surfaces, combined with the failure of AR coatings at large incidence angles, as well as the tendency for cavity surfaces to accumulate residue/debris over time that increases stray light.

If both surfaces of the cavity receive a BBAR coating, reflectivity can be as low as 0.25% (photopic) at normal incidence, though it could grow to as large as 2% at the extreme incidence angle. This can create multiple reflections between cavity surfaces, much like lens flare. According to one aspect of the invention, all internal cavities are optically eliminated using an index-matching material that uniquely accommodates the requirement for rotational reconfiguration. This is a solution that is practical for filters, because unlike a camera lens, a filter does not contain refractive power. Proper design of a pocket containing a volume of index matching grease can enable virtually unlimited rotational reconfiguration of one optical component with respect to another without introduction of voids. Moreover, filling the cavity makes it impossible to introduce residue or debris from the environment. Preferred optical greases are stable in volume (no volatiles), do not have a tendency to leave the pocket under all temperature conditions, have a refractive index matched to the surfaces, and have low scatter (e.g., due to fillers that are a significant fraction of a wavelength in size). Silicone greases are attractive for addressing all of these requirements.

The viscosity, refractive index (1.47-1.49), and clarity of available silicone greases can match the requirements well. Using a silicone grease with an index of 1.47, and a glass with an index of 1.52, the reflection at normal incidence (and virtually all other angles of incidence) is 0.028%; ten-times smaller than a high-quality BBAR coating. The viscosity of these materials tends to change very little over a broad range in temperature. The viscosity is sufficient that the material does not flow, nor show a tendency to leave the pocket. Reconfiguration of the VND via rotation creates a shear resistance. By proper selection of viscosity and cavity gap (typically 200-500 microns), the viscous drag can be controlled. The product should have a certain amount of resistance during tuning and this can be adjusted as needed to create the desired user feel.

Both air cavities for a three-polarizer VND filter are eliminated using the silicone grease. To the extent that the internal layers are well index-matched, the structure looks like a single optical slab with the local parallelism of the outer surfaces being of greatest importance. Under these circumstances, the flatness and parallelism of the outer surfaces is very important, and must be maintained during tuning. This includes the combined impact of polishing specifications, mechanical alignment, and stress-induced distortion caused by coatings. Refractive power introduced by a coating on the input surface can create a small lens effect unless a similar and inverse power exists on the camera-side surface. Alternatively, glass thickness can be increased to minimize the impact of the stress, or a coating can be applied to the back-side of the glass to balance the stress.

One of the benefits of filling the optical cavity is that it can greatly reduce the sensitivity to local flatness of the cavity surfaces. Polarizer films have an irregular surface that is typically managed in camera filters by cementing it between glass with an index-matching optical adhesive. In a conventional two-polarizer VND filter, this adds additional glass/thickness to the structure, and process steps are typically added to ensure that the outer surfaces of the sandwich are locally parallel. Providing acceptable transmitted wavefront distortion (TWD) through the sandwich can normally require double-side polishing of each element. Moreover, BBAR coatings may be required subsequently on all surfaces to mitigate stray light. All of this contributes to high fabrication cost. The addition of a third polarizer in an air-spaced configuration only exacerbates the problems of cost and stray light.

Figure 7:
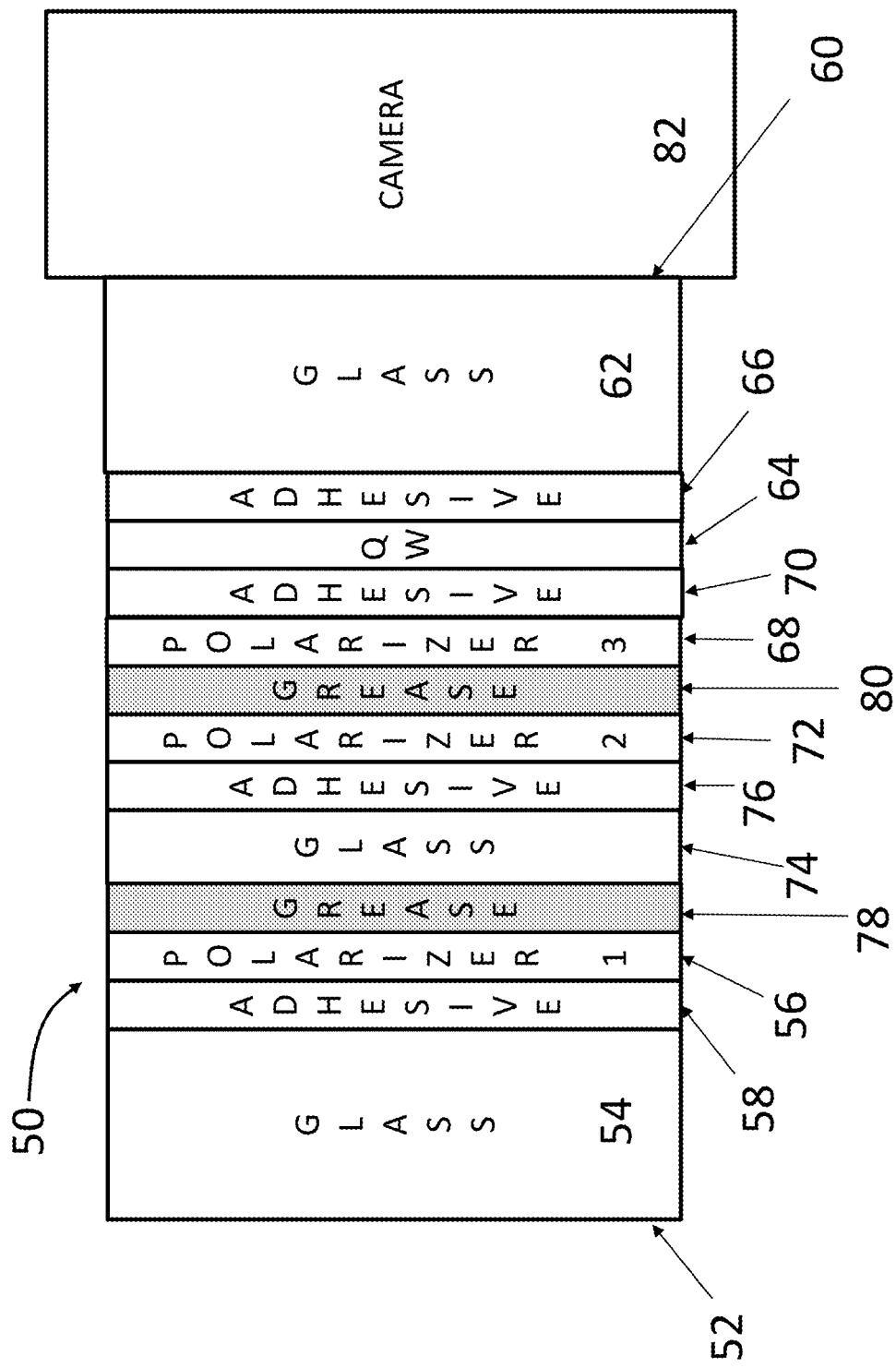
FIG. 7 is a cross-section of a three-polarizer VND filter showing all optical layers.

Filling the cavity with index matching grease in principle accomplishes the same thing as burying the polarizer film between glass. However, it can be done at a lower cost with reduced bulkiness/weight, and with elimination of the air-spaced cavity problems. According to an aspect of the invention, the polarizer films can be single-side laminated to the glass surfaces as shown in FIG. 7 using a pressure-sensitive-adhesive (PSA) common in the display industry. One surface of each polarizer film is then in intimate contact with the silicone grease after VND assembly. To the extent that the refractive index of the grease is similar to the optical adhesive that would normally be used to mount the film between glass, the optical results are virtually identical.

For use with (e.g.) a DSLR camera, it may be necessary for the polarization entering the camera to be unpolarized. This can effectively be done using a (broad-band) quarter-wave retarder oriented with slow-axis at 45° to the polarizer absorption axis, as shown in FIG. 7. The QW retarder is preferably part of the third polarizer lamination, allowing it to be rotated with respect to the camera with no optical impact.

FIG. 7 shows a cross-section of the optical layers of a three-polarizer VND filter assembly (50) of the invention. A near infrared (NIR) reflecting coating (52) is applied to the input side of glass element (54). An input polarizer (56) is bonded to glass (54) with a PSA adhesive (58). A broad-band antireflection coating (60) is applied to the output (sensor side) surface of glass element (62). A quarter-wave retarder (64) is bonded to glass (62) using PSA adhesive (66), and the sensor-side polarizer (68) is bonded to the QW with PSA adhesive (70). Middle polarizer (72) is bonded to middle glass (74) with PSA adhesive (76). The cavity formed by the surface of polarizer (56) and surface of glass (74) is filled with silicone grease (78). The cavity formed by surface of polarizer (72) and polarizer (68) is filled with silicone grease (80). In the event that it is desired for the polarizer to be laminated between glass, an embodiment uses processes that achieve acceptable TWD with minimal glass thickness. Polarizers are preferably PVA only, with no TAC layers. The (25 micron) PVA film can be bonded between glass layers using a water clear haze-free adhesive. In an embodiment, very thin glass (e.g., Schott D263) of approximately 100-300 microns is used to mount the polarizer. According to one manufacturing process, a pair of uncoated thin flexible glass sheets, which may not be globally flat, but which have low reflected irregularity (i.e. good local flatness), are used for the outer substrates of the polarizer. Specifically, irregularity is permitted, provided that the glass is sufficiently flexible that it can be removed by forcing it to conform to a reference surface. Thin glass minimizes optical pathlength and is lighter, and can be lower in haze and birefringence. A water clear adhesive is dispensed and a PVA polarizer is, for example, pinch-rolled or pressed between the glass micro sheets, distributing the adhesive and producing an uncured laminate. The uncured laminate is bubble free, but may have poor transmitted wavefront distortion, due to adhesive thickness non-uniformity of the lamination process. Subsequently, a press containing a pair of polished flats (e.g. glass) that are mounted very parallel to each other, then applies uniform pressure to the sandwich. This selects the bond-line thickness and forces the outer surfaces of the thin glass to be conformal to the press plates. The adhesive can then be cured (e.g., a UV cure) under pressure, locking in the outer surface parallelism. To the extent that the uniformity can be maintained with pressure removed, other cure methods can be used (e.g. time/thermal). Alternatively, a vacuum bagging technique can be used to cure adhesives. A heated press can also be used to achieve similar results with adhesives that reflow, such as PSAs. The finished parts, which can be under 0.5 mm thick, can then be cut from the sandwich using core-sawing, water-jet, or the like.

Figure 8:
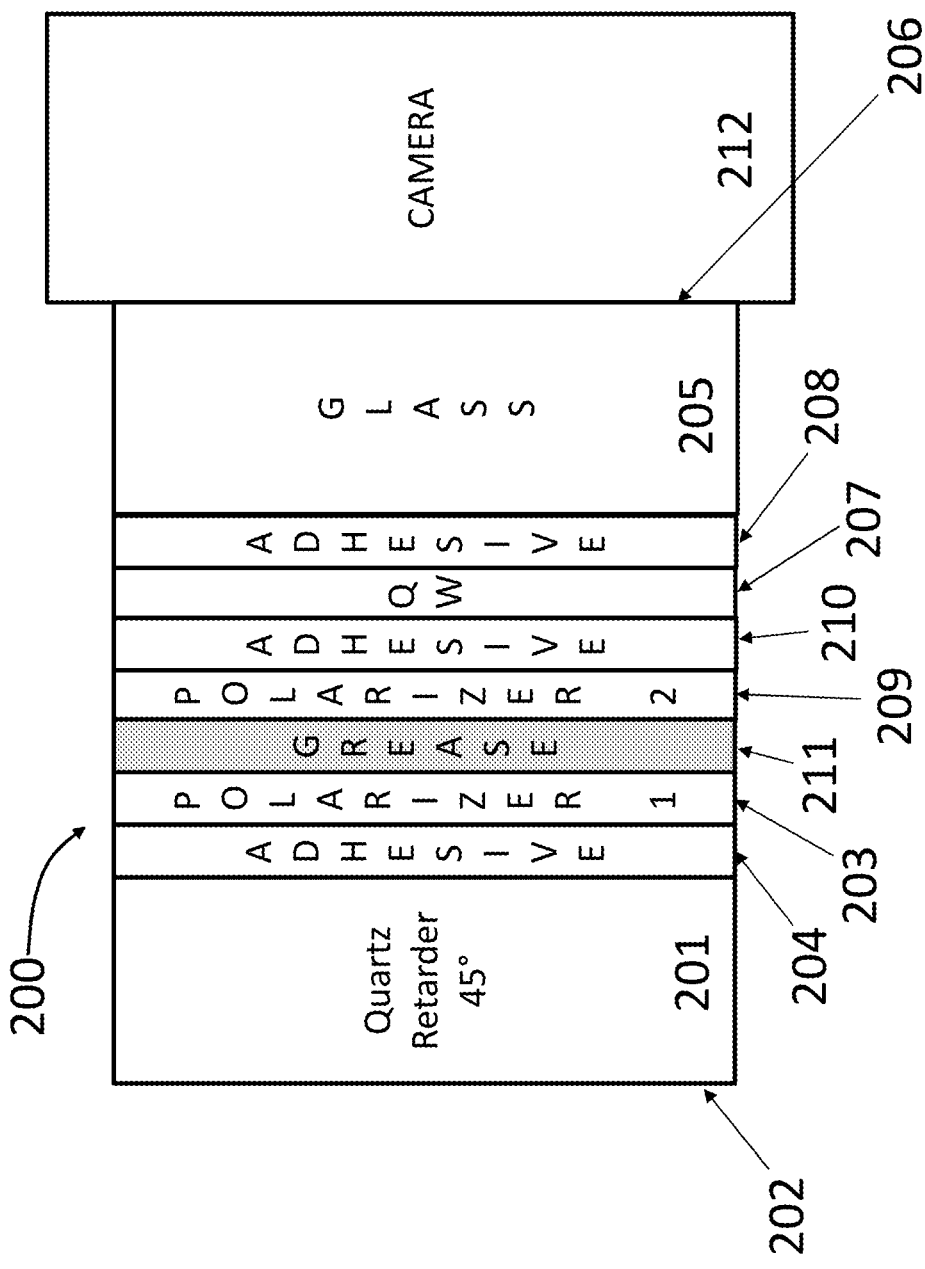
FIG. 8 Cross-section of a two-polarizer VND filter showing all optical layers.

Aspects of the techniques taught herein can also be used to improve the performance of a two-polarizer VND filter, as shown in FIG. 8. Two-polarizer VND filter (200) has an input quartz-retarder substrate (201) which has a NIR reflective coating (202). Input polarizer (203) is laminated to the back surface of quartz retarder (201) with PSA (204), where the optic axis is at 45° to the absorption axis. A second glass substrate (205) is BBAR coated (206). A quarter-wave retarder (207) is laminated to (205) with a PSA, and second polarizer (209) is laminated to QW retarder (207) with a PSA (210). The cavity formed between polarizer 1 and polarizer 2 is filled with grease (211).

In certain product circumstances it may be viable and attractive to build an "all-plastic" VND filter. For example, issues of cost and weight may be paramount. Additionally, the application may further call for a small aperture, where the stiffness/rigidity of glass is not necessary. Mobile phones, and drone cameras may allow such a solution. High optical quality plastic substrates that are sufficiently stiff can be fabricated (e.g. cell-cast acrylic), where irregularity can be minimized through casting on a flat reference substrate. Plastic substrates can also be polished to give low irregularity. Benefits of plastic over glass include low weight, low cost, and viability of low-cost manufacturing processes. This includes large-scale converting of films to laminates, applying coatings at the mother-sheet scale, and die/laser/CNC cutting of finished parts from the mother-sheet.

Spectral Considerations

Cameras have a built-in near-infrared (NIR) blocking filter due to the sensitivity of the CMOS sensor to light outside of the visible (700-1,000 nm). It may take the form of a dye filter, a multi-layer dichroic NIR reflector, an absorbing glass, or combinations of these. The quality of the camera is often coupled with the quality of the NIR filter. In many cases, these filters appear cyan due to long-wave red blocking resulting from a shallow transition slope. This is usually not problematic because it simply becomes another input parameter for the overall color balance algorithm. For an after-market VND filter with a built-in auxiliary NIR blocker, this may not be an option. That is, it may be required that the VND filter appear neutral-gray, such that no color correction is required. It is also likely required that no significant AOI dependent color shifts occur in transmission.

It is important to note that NIR blockers built into cameras have a limited dynamic range. They reduce NIR transmission to an extent that it is insignificant relative to visible transmission, but NIR is never completely extinguished. As the dynamic range of a VND filter is increased, the amount of visible light available can become comparable to the NIR leakage. The root cause is that available sheet polarizers tend to become isotropic in the NIR, typically with very efficient transmission above 800 nm. In effect, a VND filter set to a high density (e.g. OD3) acts like a NIR long-pass filter, placing unrealistic demands on the dynamic range of the built-in NIR blocker. The result typically translates into loss in image dynamic range and shifts in color. As such, a high dynamic range VND filter can require a built-in auxiliary NIR blocking filter.

A conservative view is that the aggregated NIR transmission of the VND should be comparable to the visible transmission at the highest density setting. Further, it may be required that there is no perceptible color shift from the NIR blocker at normal incidence, and no additional color shift at the extreme incidence angles (e.g.)45°. These requirements can be very challenging for typical filter technologies. For instance, absorbing glass and dye filters have relatively shallow transition slopes, so they tend to either appear cyan, or when white, contribute insufficiently to NIR blocking. Dichroic coatings can have steep transition slopes, but they tend to blue-shift and/or have side-lobes at large incidence angles. This makes it difficult to have a VND filter with both neutral gray transmission (over all incidence angles), and sufficient NIR blocking.

One aspect of the invention is spectral filtering that manages NIR leakage, enabling a useful VND filter with high dynamic range. Were polarizers available that performed well from 400 nm to 1,000 nm (e.g. wire-grid polarizers), there would be no need for an auxiliary NIR blocker because any density setting would apply to all wavelengths to which the silicon is sensitive. But typical display polarizers begin to lose polarizing efficiency at or above 700 nm. An aspect of the invention is the use of a sheet polarizer with an extended spectral coverage that creates a "don't-care band" for the NIR blocker. For instance, Sanritz UHLC 5610 polarizer performs well to a wavelength of 740 nm, so there is no need for additional NIR blocking shorter than this wavelength. On the other hand, the NIR filter spectrum can be allowed to encroach on the visible to approximately 670 nm and still appear neutral. The don't-care band is therefore approximately 70 nm wide (670 nm to 740 nm). A dichroic filter that blocks 740 nm light at normal incidence, with approximately 90% transmission at 670 nm at the extreme incidence angle, can therefore meet the objectives. The invention can include this don't-care band approach for using a dichroic filter that is otherwise problematic for wide-angle VND's due to color shift. This dichroic is preferably coated on the input surface of the VND, as shown in FIG. 7, in order to reject it on the front-end, reducing stray-light issues.

Another approach to the NIR problem according to the invention is to use a filter that is intrinsically insensitive to AOI and also has a steep transition slope. For example, multi-layer coatings that include thin layers of metal are routinely used in Low-E architectural glass. These filters are used to reject NIR from the sun, with more advanced products using repeating stacks that deliver steeper transition slopes. The "triple-silver" Low-E coating has the benefit of an angle insensitive spectral profile, good NIR blocking, and high visible efficiency. The use of a coating like the triple-silver design in a VND filter to maintain a white transmission function while effectively rejecting NIR light represents an embodiment of the present invention.

The introduction of color shift to a VND filter can also occur when non-optimum polarizer material is used. The ideal filter (using polarizers) delivers the following: (1) high, neutral transmission when a pair of polarizers have parallel absorption axes, and (2) low (>1,000:1), neutral transmission when the pair of polarizers have crossed absorption axes. The display industry has developed iodine-based polarizers that satisfy these requirements quite well. In low density settings, the transmission spectrum perpendicular to the absorption axis tends to matter most. In the three-polarizer case for example, the internal transmission function perpendicular to the absorption axis is cubed to give the color of the lowest density setting. As the density setting becomes high, chromatic leakage along the absorption axis can become problematic. If the latter is significant but neutral, it can be overcome in the three-polarizer configuration using a small change in relative angles. But if it is chromatic, the color shift increases with increasing density setting. According to an aspect of the invention, polarizers are selected that adhere to the above criteria.

While there are "white" polarizers that enable neutral transmission at low density, other high priority requirements can be difficult to satisfy in a single product (e.g. high transmission and neutral leakage), creating a tradeoff. However, within reason, a uniform and consistent hue shift from a VND filter can be auto-corrected using typical algorithms that estimate the illuminant. Or users can select a color balance as desired in post processing. However, if a VND filter is desired that preserves neutrality, a filter can be added that compensates for the overall transmission spectrum. The VND filter can be measured, along with the NIR blocker, and a filter designed with substantially the inverse spectrum, such that the product is completely neutral.

Color shift can also be introduced when the input to the VND filter is substantially polarized and a quarter-wave (QW) retarder is used to "depolarize" the input. A potential issue with a linear input polarizer is that nonuniformity can be created by the spatial dependence of the input polarization. For example, the spatial dependence of sky polarization can create a nonuniformity in brightness in a wide-angle shot when analyzed by a polarizer. As such, it may be preferable to depolarize the input polarization prior to the first polarizer. This can in principle be done using a quarter-wave (QW) retarder. However, most QW retarders are neither achromatic nor independent of incidence angle. This can also create a color/brightness nonuniformity, particularly for wide-angle shots. In one configuration, the QW retarder is omitted, and the input glass substrate can be replaced with an inorganic retardation plate. The latter can be implemented using an inorganic crystal with optic-axis in-plane, aligned at ±45° to the input polarizer. Materials can include (e.g.) quartz, sapphire, or lithium niobite. The retardation is sufficiently large (10's of waves) that the spectral oscillation caused by modulating the ellipticity of a polarized input exceeds any features in an input spectral power distribution (SPD). That is, the filtration caused by this large retarder preserves the input color, and any shifts in retardation due to off-normal incidence are inconsequential. Moreover, an inorganic retarder can have excellent TWD, where a polymer QW retarder can introduce image distortion. An aspect of the invention is the use a large retarder as a replacement for a QW retarder in a VND filter.

Mechanical Design, Assembly, and Tuning Considerations

According to an embodiment, the VND filter enables a two-step orientation process as described in pending application (Entitled Tunable Color Enhancement, PCT Application No. PCT/US2018/015041, the entire contents of which are incorporated herein by reference). In step-one, the three polarizers are rotated in unison to select the desired level of transmission of polarized input scene elements (e.g. glare attenuation/matting) at a fixed optical density. It may be preferable for polarizers two and three to default to zero-stops of attenuation during step-one in order to most accurately make this adjustment. The outer polarizer is then locked in that orientation, followed by rotation of the other set of polarizers. Because the third polarizer has the lowest angle sensitivity, it may be preferred for the user to select that orientation. The second polarizer orientation is then slaved to the third polarizer via a gearing mechanism or the like.

Figure 9:
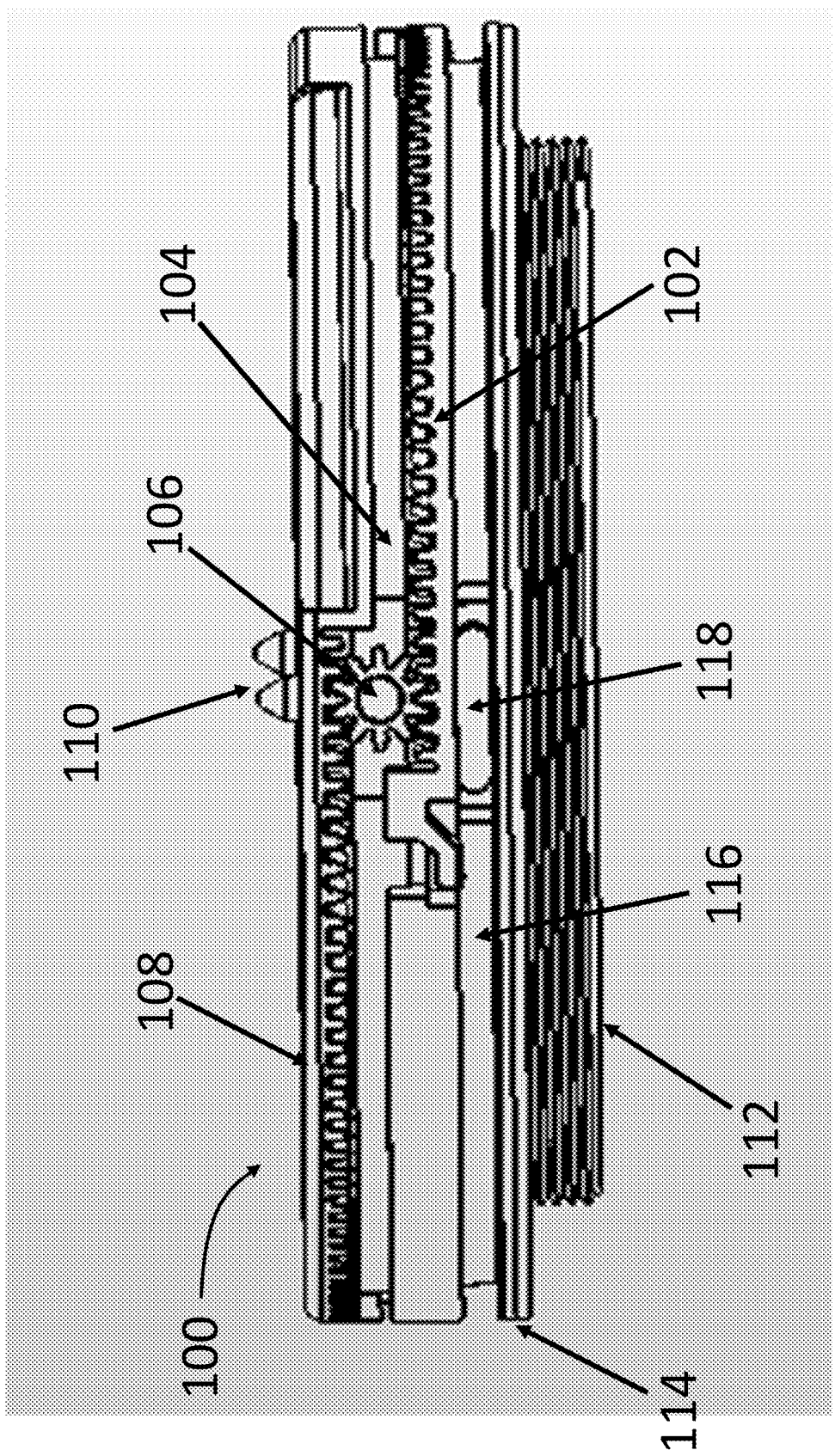
FIG. 9 shows an assembled three-polarizer configuration showing the three rings and mechanical tuning mechanisms.

FIG. 9 shows an example of the assembled VND (100), with the housing omitted. Also omitted from the figure is the rotating-ring that engages with a tab on the camera-side QW/Polarizer ring. This ring is the density selection element used by the operator. The camera-side glass (with BBAR coating and laminations) is bonded into camera-side ring (102). This ring contains a rack of teeth that allows the polarizer to rotate by 2θ with respect to the input polarization. The middle-glass (with polarizer lamination) is bonded into the middle ring (104), which has a pinion gear (106) post mounted to the side. Rotation of the camera-side ring rotates the pinion gear, which rotates the middle ring by angle (θ) with respect to the input polarizer. The input glass (with NIR reflective coating and polarizer lamination) is bonded into input ring (108). This ring also contains a rack of teeth that allows the pinion gear to complete the full range of density settings. A pair of pins (110) is used to orient and seat the assembly in the housing after optical assembly is completed. This particular configuration accommodates the two-step tuning method described previously. That is, the aforementioned three-ring assembly unit can rotate with respect to flange (112), which has a threaded portion for attachment to a camera lens. A lip on flange (112) is used to enclose the optical assembly and to secure it to the housing (not shown). Flange (112) further contains a series of ridges that engage with ridges on clutch plate (116) to inhibit rotation while changing density setting. A tab (118) on the clutch plate protrudes through the housing. The user can depress the tab, substantially eliminating rotational resistance of the optical assembly with respect to the flange. This allows selection of the orientation of the input polarizer mounted to input ring (108) without changing the density setting.

Figure 10:
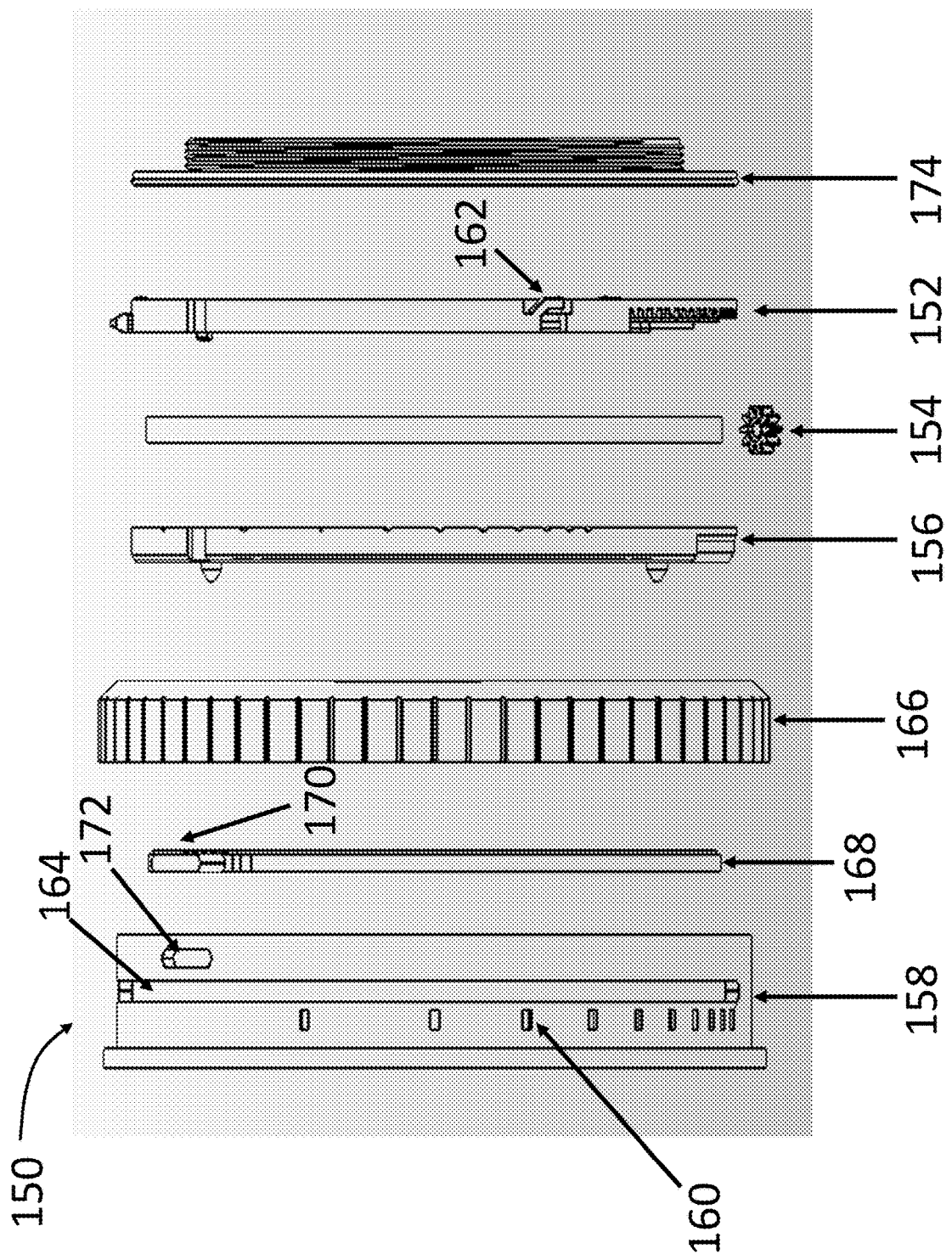
FIG. 10 shows a mechanical blow-up of the three-polarizer VND filter.

FIG. 10 is a blow up (150) showing all of the elements for the VND filter described in FIG. 9. The optical assembly includes camera-side ring/filter (152), middle ring/filter (154) with pinion, and input ring/filter (156) which are assembled using silicone grease between the two cavities. The assembly is then inserted into housing (158). The housing contains features (160) that identify angles corresponding to discrete stops in attenuation. A tab on the camera-side filter ring (162) engages with these features, creating a detent that allows a user to identify the number of stops of attenuation by feel.

The housing (158) further contains a slot (164), through which a tab on the camera-side filter ring extends, allowing rotation of camera-side ring (152). After the optical assembly is inserted, the rotating ring (166) slips over the housing. It has an interior slot that engages with the tab on ring (152). After the rotating-ring is installed, the clutch plate (168) is inserted. It contains tab (170) that passes through a slot (172) in housing (158) to allow the user to rotate the optical assembly with respect to the camera. The threaded flange (174) is then attached (e.g., press fit) to housing (158). The housing can rotate freely on the flange when the clutch-plate tab is depressed.

To summarize, a sequence for assembling the VND filter according to the configuration of FIGS. 9 and 10 can be as follows:
1. Die-cut polarizer and PSA laminate polarizer to the (three) glass disks.
2. Bond polarizer/glass into rings with optical alignment of polarizer orientation relative to registration features on rings.
3. Dispense grease and press three rings together, registering gear racks on outer rings with respect to a pinion gear on the middle ring.
4. Insert three-ring optical assembly into housing, pushing the tab through the slot.
5. Slide the rotating ring over the housing.
6. Insert the clutch plate.
7. Attach the flange to the housing.

One of the benefits of a variable neutral density filter is that real-time analog adjustments in density can be made to optimize the captured image as the input brightness changes. Clearly this functionality is not enabled by fixed neutral density filters, where the user must make a best-guess in selecting density level. Moreover, a VND filter can enable a closed-loop system that auto-adjusts density based on the real-time brightness of the input. In the case of video capture, this is a particular powerful capability for minimizing the impact of the "jello effect" resulting from non-optimum integration time. The 50:50 duty ratio (or "180° shutter angle") is a well-known setting for minimizing this effect to create a more cinematic look.

Tuning the VND filter can be done manually, or electro-mechanically. The input sensor for determining the optimum density level can be the human eye or some form of electro-optical sensor. The latter can be a forward-looking sensor measuring aggregated brightness, or brightness in the center of the field, or it can be a multi-pixel sensor that measures brightness in different zones of the input scene. It can be an auxiliary sensor, or it can be the image sensor itself. Ultimately, the information extracted from sensing the input brightness is converted to a single output that drives the density of the VND filter. This can be change on-the-fly, limited only by the time constant associated with measuring the input and moving the VND actuator. The actuator can be a motor used for tuning zoom lenses, or the like.

Other Configurations and Applications

The present invention is not limited to four polarizers. Yet further reductions in contrast non-uniformity can be realized by adding additional degrees of freedom. The multi-polarizer invention can also be combined with other (e.g. retarder-based) compensators. To the extent that multi-layer retarder stacks can be designed that correct for geometry in an achromatic fashion, further performance benefits can be realized. Other relationships between angles of a three, or more, polarizer design are possible. The examples given verify that the use of three or more polarizers can greatly reduce angle-dependent non-uniformity, though they are not meant to limit the scope of the invention.

The VND filters described in the invention can be used to improve the performance of any system requiring dimming of an input light over a large field of view with angle-stable transmission and color performance. Fields include consumer, commercial, industrial, medical, and military applications. The invention is generally useful for wide-angle analog control of light level. With suitable adjustment in polarizer technology, the concepts can be applied to other spectral bands (e.g., infrared or UV). The invention can be used for shuttering, temporal modulation, or on-demand transmission selection. For image capture or any sensors, the VND filter can be placed at various locations in an optical train. This includes for example, outside of a camera lens, within a camera lens (e.g., an aperture stop or image relay), or at/near the image plane where the sensor resides.

The invention enables remote and automated selection of transmission level. In unmanned aerial vehicles, or drones, for example, the invention enables a sensor to receive the optimum brightness level without any human intervention. It also allows remote changes in density by a user observing the camera feed.

The invention also enables periodically modulated density, as may be required for example in high-dynamic-range video capture. This can be done by synchronizing the capture with the modulation of the VND filter. The modulation can be accomplished using polarizers that spin rapidly, while maintaining the angular arrangement described in the invention.

The invention can be applied to any application where fixed and two-polarizer VND filters are currently used. This includes, for example, long-exposure still-capture to create a particular image look. Density adjustment allows selection of shutter time independent of scene brightness. This allows control of integration time relative to temporal changes occurring in a scene. For example, random motion of sea water can be temporally averaged, smoothing spatial structure that would otherwise be captured with a short exposure. The VND filter enables this without reducing aperture, or it makes it possible when the aperture is already fully stopped down.

In the event that further improvements in uniformity are required, image processing techniques can be used. In principle, knowledge of a superimposed (e.g., cross) spatial pattern allows it to be substantially removed in post-processing. This is relatively straightforward for a lightness error, versus a color shift. Since a color shift often involves "estimating the illuminant," corrections can become ambiguous. For a known field of view, the image luminance channel can be multiplied by the inverse of the (known) VND transmission polar plot.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

The invention claimed is:

1. A variable neutral density filter (VND), comprising:
a first polarizer;
a second polarizer;
a third polarizer; and
a mechanical tuning structure comprising a first actuator that rotates the second polarizer, and a second actuator that rotates the third polarizer;
wherein the first, second; and third polarizers are neutral;
wherein the first and second polarizers form a first attenuation stage, with transmission determined by a first angle formed between the first and second polarizer absorption axes;
wherein the second and third polarizers form a second attenuation stage, with a transmission determined by a second angle formed between second and third polarizer absorption axes, wherein the first actuator is slaved to the second actuator to rotate the second polarizer in direct proportion to the rotation of the third polarizer wherein the third polarizer rotates at substantially twice the rate of the second polarizer, wherein the second and third polarizers have the same sign of rotation;
wherein the composite transmission of the first and second attenuation stages is the product of the first stage transmission and the second stage transmission;
wherein the first and second angles are selected to preserve the normal-incidence composite transmission for rays incident off-normal.

2. The VND filter of claim 1, where the angle between first and second polarizers is +θ, and the angle between second and third polarizers is +θ.

3. The VND filter of claim 1, wherein the VND includes at least 10-stops of attenuation and the transmission non-uniformity is below 0.5 log units at 10-stops of attenuation of polarized light at an incidence angle of light rays entering the VND exceeding 35°.

4. The VND filter of claim 1, wherein a first cavity is formed between the first polarizer and the second polarizer and a second cavity is formed between the second polarizer and the third polarizer and the first and second cavities are each filled with an optical grease.

5. The VND filter of claim 4, wherein the first, second, and third polarizers are laminated to transparent substrates using a pressure-sensitive-adhesive.

6. The VND filter of claim 1, wherein a third actuator rotates the first polarizer, the second polarizer, and the third polarizer in unison.

7. The VND filter of claim 1, further includes a number of stops of attenuation and detents, wherein the detents provide the number of stops of attenuation by user feel.

8. The VND filter of claim 1, further includes a number of stops of attenuation and markings, wherein the markings provide a visual indication of the number of stops of attenuation.

9. The VND filter of claim 1, wherein the second polarizer rotates at half the rate of the third polarizer.

10. The VND filter of claim 1, wherein the mechanical tuning structure is an electro-mechanical device.

11. The VND filter of claim 1, wherein a user remotely tunes the density based on brightness information from either a camera feed or an electro-optical brightness sensor.

12. The VND filter of claim 1, further including an electro-optical brightness sensor, wherein an optimum brightness level is pre-selected and the mechanical tuning structure and the brightness sensor form a closed-loop system that auto-selects a density to achieve the optimum brightness.

13. The VND filter of claim 1, wherein the VND filter can be installed on an unmanned aerial vehicle camera.

14. The VND filter of claim 1, wherein the VND filter can be installed on a drone camera.

15. The VND filter of claim 1, wherein the angle between the first and third polarizers is twice the angle between the first and second polarizers.

* * * * *